United States Patent
Cella et al.

(10) Patent No.: US 7,610,221 B2
(45) Date of Patent: *Oct. 27, 2009

(54) SYSTEMS AND METHODS FOR CONTINGENCY-BASED OPTIONS AND FUTURES FOR GAME TICKETS BASED UPON GAME PARTICIPANT STANDINGS

(75) Inventors: Charles H. Cella, Pembroke, MA (US); Edward J. Kelly, Wellesley, MA (US); Matthew P. Vincent, Georgetown, MA (US)

(73) Assignee: The Ticket RESERVE, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/875,487

(22) Filed: Oct. 19, 2007

(65) Prior Publication Data
US 2008/0103922 A1 May 1, 2008

Related U.S. Application Data

(63) Continuation of application No. 09/586,723, filed on Jun. 5, 2000, now Pat. No. 7,363,267.

(60) Provisional application No. 60/137,310, filed on Jun. 3, 1999.

(51) Int. Cl.
*G06Q 30/00* (2006.01)

(52) U.S. Cl. .......................................... 705/26

(58) Field of Classification Search .................. 705/26, 705/27
See application file for complete search history.

(56) References Cited

U.S. PATENT DOCUMENTS

| | | | | |
|---|---|---|---|---|
| 5,797,127 | A | * | 8/1998 | Walker et al. .................. 705/5 |
| 5,970,479 | A | | 10/1999 | Shepherd |
| 7,206,755 | B1 | * | 4/2007 | Muralidhar .................. 705/26 |

OTHER PUBLICATIONS

Sports Editors, "Huge Momentum Carries Over for Titans Tickets; 100 PSLs Sell on Monday; Season Opener Against Cincinnati Looms as Next Sellout," Business Wire, New York, Jul. 26, 1999, p. 1.*
Krueger, Alan B., "Wait Till Next Year, But Lock in the Ticket Price Now," New York Times (Late ed.), New york, Feb. 2, 2006, p. C3.*
-, "U.S. Appl. No. 11/875,473", Notice of Allowance, (Feb. 25, 2009), 13 Pgs.

(Continued)

*Primary Examiner*—Amee A Shah
(74) *Attorney, Agent, or Firm*—Strategic Patents, P.C.

(57) ABSTRACT

Methods and systems of establishing a network-based system for purchase and sale of at least one of an option contract and a futures contract to acquire an item or to attend an event, wherein the contract is exercisable upon the occurrence of a contingency. The contingency may relate to the presence of a particular team in a game and the location of the game. In some instances, the contingency may relate to the position of a participant in the event in the standings at a time proximate to the occurrence of the event.

20 Claims, 10 Drawing Sheets

OTHER PUBLICATIONS

-, "U.S. Appl. No. 11/875,504", Notice of Allowance, (Mar. 6, 2009), 13 Pgs.

-, "U.S. Appl. No. 11/875,675", Notice of Allowance, (Mar. 18, 2009), 13 Pgs.

"U.S. Appl. No. 11/926,077, Non-Final Office Action mailed Jun. 16, 2009", 18 pgs.

"Notice of Allowance", U.S. Appl. No.-11/875,473, (Jun. 26, 2009), all.

"Notice of Allowance", U.S. Appl. No.-11/875,504, (Aug. 7, 2009), all.

"Notice of Allowance", U.S. Appl. No.-11/875,675, (Aug. 10, 2009), all.

* cited by examiner

| | TEAM-ROUND-GAME 1 | TEAM-ROUND-GAME 2 | ... | TEAM-ROUND-GAME N |
|---|---|---|---|---|
| TICKET 1 | BID IDENTIFIER BID AMOUNT | BID IDENTIFIER BID AMOUNT | BID IDENTIFIER BID AMOUNT | BID IDENTIFIER BID AMOUNT |
| TICKET 2 | BID IDENTIFIER BID AMOUNT | BID IDENTIFIER BID AMOUNT | BID IDENTIFIER BID AMOUNT | BID IDENTIFIER BID AMOUNT |
| ... | BID IDENTIFIER BID AMOUNT | BID IDENTIFIER BID AMOUNT | BID IDENTIFIER BID AMOUNT | BID IDENTIFIER BID AMOUNT |
| | NO BID | BID IDENTIFIER BID AMOUNT | BID IDENTIFIER BID AMOUNT | BID IDENTIFIER BID AMOUNT |
| | NO BID | BID IDENTIFIER BID AMOUNT | BID IDENTIFIER BID AMOUNT | BID IDENTIFIER BID AMOUNT |
| | NO BID | NO BID | BID IDENTIFIER BID AMOUNT | BID IDENTIFIER BID AMOUNT |
| ... | NO BID | NO BID | BID IDENTIFIER BID AMOUNT | BID IDENTIFIER BID AMOUNT |
| TICKET N | NO BID | NO BID | MINWIN | MINWIN |

Fig. 8

SYSTEMS AND METHODS FOR CONTINGENCY-BASED OPTIONS AND FUTURES FOR GAME TICKETS BASED UPON GAME PARTICIPANT STANDINGS

BACKGROUND OF THE INVENTION

The advent of computer networks offers geographically distributed users unprecedented opportunities to interact with each other and to work together on content. One of the most widely accepted and heavily used networks is the Internet. The Internet is a global system of interconnected computer networks formed into a single world wide network. A user, through the Internet, can interactively transmit messages with users in different locations. Similarly, a user in one location can connect to files and libraries in other locations. Thus, the Internet provides versatile communications functions and acts like a universal library, providing electronic access to resources and information available from Internet sites throughout the world. Access to the Internet can be had from a wide range of locations and through a wide range of devices. For example, a user with a laptop computer and a modem may connect to the Internet through a telephone jack. Wireless Internet connections are also available.

Electronic commerce has emerged as primary use of the Internet. The global penetration of the Internet provides merchants with the capability to merchandise their products to substantial shopping audiences using an online merchant system. Online merchant systems enable merchants to creatively display and describe their products to shoppers using Web pages. Merchants can layout and display Web pages having content, such as text, pictures, sound and video, using HyperText Markup Language (HTML). Web shoppers, in turn, access a merchant's Web page using a browser, such as MICROSOFT EXPLORER or NETSCAPE NAVIGATOR, installed on a client connected to the Web through an online service provider, such as the Microsoft Network or AMERICA ONLINE. The browser interprets the HTML to format and display the merchant's page for the shopper. The online merchant system likewise enables shoppers to browse through a merchant's store to identify products of interest, to obtain specific product information and to electronically purchase products after reviewing product information.

Thus, the Internet is used to assist buyers and sellers in purchasing a variety of traditional goods and services. Novel methods of purchasing and selling have been developed, including cryptographic systems and methods for assuring authenticity of a signer of a transaction, electronic payment systems, and electronic auction systems and methods. Electronic commerce Internet sites typically allow remotely distributed users to interact via an Internet site, through which the users execute traditional commercial transactions online. Thus, the Internet typically offers convenience, but does not significantly alter the underlying transaction contexts.

However, the present online methods of selling services and goods generally do not account for the presence of uncertainty in the market for those goods or services. It is well recognized that a purchaser who purchases a good or service in advance of its need may be disappointed if the price falls, or if the need for the good or services disappears. A wide range of contingency planning measures are undertaken by buyers and sellers in markets that involve uncertainty. However, the Internet models of commerce generally ignore event-driven contingency planning and are therefore, in large part, unsatisfactory where the desire to purchase a good or service are primarily motivated by the outcome of an event certain in time.

An example of a market involving substantial uncertainty is the market for goods and services surrounding a sporting event, especially a sporting event in which the presence of particular teams is not known well in advance of the time of the event. One such event is the SUPER BOWL. NATIONAL FOOTBALL LEAGUE Fans are notoriously loyal to particular teams, but the two particular teams that will appear in the SUPER BOWL are not known until two weeks before the game. A fan of a particular team may not wish purchase a game ticket, airfare, hotel or other accommodations unless his or her team will be in the game; that is, the fan's desire to attend the game is contingent on the outcome of a future event(s), namely the progression of a team through the earlier playoff games. In the present environment, hotels, air carriers and other transportation providers must often scramble to finalize arrangements for goods and 25 services required by a particular group of people, the identity of which are not known until the occurrence of the contingency, i.e., the presence of a particular pair of teams in the SUPER BOWL. Moreover, under current business systems, the inability to identify customers until only a week or two before the event prevents certain purveyors from participating in the market in any effective way. For example, chaffer airlines may be significantly disadvantaged where fans need to be flown to the SUPER BOWL from cities for which the charter company does not have a regular route. For instance, despite the general ability of the charter companies to offer fares lower than commercial air carriers on less than 14 day notice, the ability to book passengers can be substantially hindered by the inability of the charter to penetrate the advertising market on short notice.

SUMMARY OF THE INVENTION

Disclosed herein are methods and systems for futures and options pricing, purchasing and selling, for tickets, travel and lodging accommodations and other service or good associated with the event. In accordance with the present invention, computer networks, such as the Internet, which allows an increasingly large number of purchasers and sellers to participate in electronic markets, may be used to facilitate options transactions for tickets to and/or accommodations based on the occurrence of such contingencies as the participation of a given team or individual, occurrence of the event at a given location, weather conditions, or the like. As used herein, except where the context calls for a particular type of option or futures contract, it should be understood that the terms "option" and "future" should be understood to encompass any contract that embodies a contingency, including so-called American and European options, futures, and other derivative contracts. Depending on the context, a futures contract, where the buyer is required to commit to purchase a particular ticket or other particular services at an advance date if the contingency occurs, may be desired. In other contexts, the buyer may be given a more classic option, where the buyer has the opportunity to purchase, or not to purchase, if the contingency occurs. Methods and systems disclosed herein are intended to offer complete flexibility as to the nature of the underlying contingency, as well as to the nature of the commitment of the buyer to purchase the ticket and/or accommodation.

In an embodiment disclosed herein, the context is the purchase and sale of options to purchase one or more tickets to a sports event based on occurrence of contingent events, such as the presence of a particular team in the sporting event.

In an embodiment disclosed herein, the context is the purchase and sale of options to purchase travel accommodations, such as airline tickets or hotel rooms, based on occurrence of contingent events. In an embodiment, disclosed herein, one example of a contingency is the presence of a particular team in a particular sporting event for which a particular fan's need for travel accommodations to the game will be dependent upon, at least in part, the appearance of a particular team in the event. In an embodiment, the goods and services are at least one of an event ticket, an airline ticket, a charter airline reservation, a hotel reservation, a rental car reservation, a restaurant reservation, a bus ticket, and a train ticket.

Provided herein are methods and systems of electronic commerce establishing a network-based on-line system for purchase and sale of an option or futures contract to acquire a event tickets and/or travel accommodations, e.g., airline tickets, to a contingent ticketed event. As used herein, the term "ticket" or "reservation" or "accommodation", as will be evident from its context, should be understood to encompass include any permission, contract, reservation, license, or similar right, or evidence of the same, permitting a person or entity to attend an event (such as a sporting event) and/or utilize a travel service (e.g., airline service, hotel service, etc.) where such permission, contract, license or similar right is limited to those having reservations.

As used herein a "contingent event" should be understood to be an event the occurrence of which is contingent upon occurrence of other factors, including, for example, an event that is certain to occur but for which the participants, content and/or location(s) are not predetermined, an event that is tentatively scheduled, an event that is subject to cancellation or change in the constituents, and the like. A "contingent ticketed event" should be understood to encompass contingent events for which tickets are required. Examples of contingent ticketed events include playoff and tournament sporting events. Examples of contingent ticketed events include playoff and tournament sporting events, plays, concerts and other performances where presence of particular performers is not known until some period of time after the event is planned, admission tickets to events or venues that are weather-dependent, and many others.

In an embodiment, the contingent event may be defined by party seeking an option or futures contract. That is, the systems and methods disclosed herein may establish a marketplace in which a person seeking an options or futures contract may define and post a request, such as on a host Internet site, including a contingency event, a desired good or service the desire for which is dependent on the contingency and an offer or bid for an option or futures contract to acquire the goods or services if the contingency event occurs. Potential providers of the goods, services, or other items identified in the request could then respond by accepting the request or by offering a different price. Similarly, providers of goods and services could identify and post offers, such as on an Internet site, including a contingency event, a good, service, or other item the supply or demand for which is dependent on the contingency event, and the price at which the seller is willing to enter into a provide the good, service or other item at a predetermined price. Pricing of the option could be varied to provide a range of option prices to obtain a range of goods or services at a range of prices. Thus, a general marketplace can be established for permitting users, including buyers and sellers, to define and negotiate contingency event-based options and futures contracts.

Also disclosed herein are methods and systems for allowing a user to purchase an option or futures contract for a ticket to a contingent event, e.g., a contingent ticketed event, and/or travel accommodation surrounding that event, including a processor operative with a program to (a) identify tickets (or other forms of reservation) for a contingent event or an accommodation related thereto; (b) enter bids for an option or futures contract to purchase the ticket or accommodations; and (c) rank the bids.

In an embodiment, the contingent event may be a participant-event. As used herein, "participant event" should be understood to encompass a contingent event in which a particular participant participates or is eligible for participation. A "participant" should be understood to include any person or entity that can participate in a contingent event; thus, the participant could be a team in a team sports event, an athlete in an individual or team sport, an entertainer in a tentatively scheduled event, or other person or entity. Examples of participant events include presence of a particular team in a particular round of playoffs, presence of a particular athlete in a particular tournament, and the like.

In embodiments of methods and systems disclosed herein, the participant-event for which an options or futures contract for tickets and/or accommodations may be purchased may be a team-game, team-round, or a team-round-game. As used herein, a "team-game" should be understood to encompass a game in which a particular team participates, and a team-round-game should be understood to encompass a round of games in which a team participates, and a team-round-game should be understood to encompass a particular game of a particular round in which a team participates. An example of a team-round-game would be the presence of the CINCINNATI REDS in the first game of the NATIONAL LEAGUE Championship Series of the MAJOR LEAGUE BASEBALL playoffs.

Also disclosed herein are methods and systems for allowing a user to bid on an option to purchase a ticket or travel accommodations to a contingent ticketed event, including database having stored therein an option or futures record having a team field representative of a participant being a candidate for participation in the contingent event, an event field representative of the sporting event, and a value field representative of a value of a minimum winning bid to purchase an option or future for a ticket or travel accommodation to the event if the participant is selected to participate in the event; and a server, in connection with said database, and capable of processing a bid representative of a request to purchase one or more of said options or futures, and being capable of processing said bid and said option or futures record to adjust the minimum winning bid value and to allocate an option or futures contract to the winning bid. As used herein "database" should be understood to encompass any of a variety of computer software, computer hardware, firmware and other products capable of storing data and records, such as products provided by ORACLE and others, including relational and object oriented databases. As used herein, "server" should be understood to encompass any device or method capable of interacting with a client or plurality of clients or similar devices or supporting a network computing environment or providing access to computing services, including hardware servers, software servers, web servers, HTTP servers, and any other available type of server.

Also provided herein are methods and systems for allowing a remote user to purchase, over a distributed computer network, an option or futures contract for tickets or travel accommodations to a contingent event, e.g., a contingent ticketed event, which system includes a host server operative with a program including an event database connected in communication with said host server, said database including participant-event identifiers each representative of a ticket or travel accommodation for a contingent participant-event, an option or futures bid database in communication with said host server, said option or futures bid database including allocation fields representative of an option or futures bid for each of said ticket or travel accommodations, and an interface manager implemented on said server and in communication with said databases; wherein said interface manager processes option or futures bids from remote users to determine whether to accept the option or futures bid and to update the allocation field.

As used herein, "network" should be understood to include the Internet, worldwide web, wide area networks, local area networks, Intranets, Extranets, telephone networks, cellular networks, and other connections capable of supporting communications, file transfers, and other functions over distance.

As used herein, "identifier" should be understood to comprise any indicator, identifier, record, or combination of the same that is capable of embodying or representing a data record and may include the capability of identifying a location in computer memory as well as data allocated to particular data fields. Systems and methods disclosed herein may include contingent event identifiers for records relating to particular events, including participant-event identifiers for records relating to participant-events, athlete-game identifiers for records relating to the presence of an athlete in a game, entertainer event identifiers for records relating to the presence of an entertainer in a contingent event, and the like.

Systems and methods disclosed herein allow a user to purchase an option or futures contract for goods or services related to a contingent event, comprising a processor operative with a program to identify goods or services related to a contingent event; enter bids for an option or futures contract to purchase the goods or services; and rank the bids.

The goods or services may be a wide range of goods and services related to the existence of the contingent event, such as, in the case of a sporting event ticket, an airline ticket, a charter airline reservation, a hotel reservation, a rental car reservation, a restaurant reservation, a bus ticket, a train ticket, and a ticket or reservation to an attraction in the locale of the contingent ticketed event. Thus, users can purchases packages of goods and services based on the occurrence of the contingencies that give rise to a particular contingent event. A similar suite of goods and services may surround other contingent events.

In an embodiment, the contingent event may be defined by party seeking an option or futures contract. That is, the systems and methods disclosed herein may establish a marketplace in which a person seeking an options or futures contract may define and post a request, such as on a host Internet site, including a contingency event, a desired good or service the desire for which is dependent on the contingency and an offer or bid for an option or futures contract to acquire the goods or services if the contingency event occurs. Potential providers of the goods, services, or other items identified in the request could then respond by accepting the request or by offering a different price. Similarly, providers of goods and services could identify and post offers, such as on an Internet site, including a contingency event, a good, service, or other item the supply or demand for which is dependent on the contingency event, and the price at which the seller is willing to enter into a provide the good, service or other item at a predetermined price. Pricing of the option could be varied to provide a range of option prices to obtain a range of goods or services at a range of prices. Thus, a general marketplace can be established for permitting users, including buyers and sellers, to define and negotiate contingency event-based options and futures contracts.

Also, once systems and methods are established whereby an option or future may be defined, offered and sold, the same systems and methods can be used as a secondary marketplace for the options or futures, as well as for the underlying goods, services, information and other items to which the options and futures relate. An option or futures contract for a contingent event ticket would have a different value, depending on the probability of the contingent event's actually occurring. For example, if a particular team loses a game, then the probability of that team's making the playoffs is reduced, thus reducing the value of the option or futures contract for a ticket to that game involving that team. As the values diminish, optionholders may be willing to sell the options to recover some of the original purchase price. Similarly, others may be willing to buy at a lower price. Thus, a marketplace can be established where purchasers and sellers trade in options that are based on contingent events. Trading can be expected in any case where there are marketplace events that change the value of options; i.e., events that change the likelihood of a contingency emerging. Where contingencies emerge after a chain of many related marketplace events (such as the progression of a sports season), an active marketplace can be established for the trading of options and futures contracts based on the events.

Once a marketplace is established, it is possible to establish another level of options, futures or other derivative securities. Thus, for each type of options or futures contract described herein, there can exist still another class of options and futures contracts to acquire the options or futures. Thus, while there may only be a fixed number of available tickets, and only a fixed number of options can actually result in delivery of the ticket, a far larger number of individuals may purchase and sell options than can actually provide or take delivery on the tickets. Individuals who have a delivery obligation, but cannot ultimately deliver tickets, will be required to "cover," by paying the purchasers the value of the promised options (as measured, for example, by the trading price of an option or futures contract as of a fixed date). Thus, as in trading markets for commodities, many more options and futures are traded than underlying commodities are delivered. Additional levels of "options on options" could be envisioned and are encompassed by the present disclosure.

A wide variety of possible contingent event-based options and futures, related secondary markets, and options on options can be enabled by systems and methods disclosed herein. The following examples are intended to illustrate some examples of contingent events on which such options and markets can be based, but are by no means exhaustive. Other embodiments evident to those of ordinary skill in the art are intended to be encompassed by the present disclosure.

A contingency event may be any event that is expected to occur, but the outcome of which is unpredictable.

In one embodiment of the invention, the contingency event is related to weather. It can be predicted that weather will be relevant to a wide range of goods, services, and activities, but the weather itself cannot be predicted with a high range of long-term accuracy. Thus, a buyer 102 could purchase an option or futures contract for delivery of a weather-dependent good or service, with the purchase contingent upon the occurrence of a measurable weather event at a given time. Weather-dependent goods and services that could be made the subject of weather-contingent options and futures contracts include, but are not limited to air travel, skiing, weddings, parties, concerts, sports events, vacation packages, hotel reservations, all outdoor events and activities, hiking, camping, golf, surfing, swimming, amusement park attendance, and many others. Thus, for example, a purchaser could purchase an option to purchase a vacation package to a Caribbean island, contingent on the absence of any hurricanes in the Atlantic ocean one week before the date of departure. Similarly, a skier could purchase an option to have a hotel room and lift ticket at a given price, if there is a predetermined minimum amount of snow on the selected mountain a given number of days before the date of the ski trip. The options would allow buyers to purchase with diminished uncertainty, while sellers would have advance notice of potential demand. As with sports event options described above, the advance notice would permit planning, marketing of related goods and services, and, in some cases, the sale of multiple options for the same good or services. For example, many individuals are highly interested in bad weather. For example, a weather expert, newsperson, or weather buff might have a strong desire to have the opportunity to observe a hurricane close hand, while a vacationer might have no desire to vacation during the same storm. Thus, an option or futures contract for a travel package could be sold to each of them, with the former getting the package if a hurricane was identified as being within a given distance from the location at a given time, and the latter getting the package otherwise. Similarly, many non-ski attractions have arising around ski resorts, such as outlet shopping, family entertainment complexes and the like. However, during the peak season, price rise, and non-skiers typically avoid these locations. If there is no snow, there is substantial unused capacity at a given time. In order to help fill the unused capacity, options and futures contracts can be established to permit one person (presumably a skier) to have a hotel room, dinner reservation, or the like if there is a predetermined amount of snow and to permit another person (presumably a non-skier) to have the same item (presumably at a "non-peak" price) if there is less than the predetermined amount of snow. In other words, the systems and methods enable vendors to offer the same item to different individuals, depending on different tastes for weather-related goods and services. Weather related options and futures contracts would be particularly effective in booking off-peak times, such as early and late season skiing, golf, beach vacations, and the like. Thus, vendors could identify interested parties who would commit to purchase a package of items if the weather, as of a given date, is appropriate for the particular activity. For example, a skier could commit to a ski package in October or May, which would be contingent on the presence of snow. Knowing the skier might arrive, the vendor could target advertising for a host of related products and services, even if the skier doesn't end up purchasing the package.

In other embodiments, the contingent event may consist of a blending of one or more contingencies, including any of the contingencies identified herein. Thus, for example, skier might purchase an option to acquire a hotel room and lift ticket on a particular mountain in May, if there is adequate snow, and if the price is lower than a predetermined amount.

In other embodiments, the contingency may be the unavailability or limited availability of a particular good or service. Thus, a user might purchase an option of futures contract to purchase a good, service, or other item if that item is sold out in the user's area, or if the price of the good in that area exceeds a predetermined price. Such a contract could identify a particular good or suite of goods of a given type. Examples might include popular toys, CDs, and other consumer items. For example, a buyer might purchase an option to acquire a particular item (or any of a group of items) offered by a major toy store, if the item or one of the items is sold out on December 20 of a given year. Similarly, a buyer could purchase an option to purchase tickets to a particular event, if the event is sold out. A buyer could purchase an option to acquire services, if the market rate for the services exceeds a certain rate, or if there are no individuals offering the services at a given time. The services could be a wide range of services, such as professional services, contracting services, legal services, accounting services, consulting services, plumbing services, development services, design services, engineering services and the like.

More generally, contingency events may include any events where different outcomes are possible, and where different purchasers are capable of benefiting from the different outcomes. Thus, any goods or services where buyer tastes vary depending on the outcome, such as weather, sporting events, performances, and the like.

In another embodiment, the contingency event may be the popularity of a particular item. For example, television programs are rated according to number of households and percentage of viewing households for each program. Those ratings reflect the popularity of a particular program. Whether a particular program has a particular popularity rating can be a contingency event upon which an option to purchase advertising time or space is based. Similar options and futures can be established for advertising in periodicals and books based on the circulation of the same. Similar options and futures can be established for Internet space. Since demographic information is often made available, options and futures can be established where the contingency event is the establishment of a particular rating in a particular demographic. Thus, for example, an advertiser could purchase air time at a given price and time if a particular television show has achieved an average of a twenty percent audience share among women aged twenty to thirty. As with other embodiments, a secondary market can be established, with market information arising each time ratings are announced, encouraging trading of options based on the ratings. Also, secondary services and goods can be targeted to particular advertisers, based on what they are seeking to advertise.

The methods and systems established herein can also be used to establish options and futures for non-traditional goods and services, where a future need is known and the buyer wishes to lock in the current price. Any goods or services can be covered, ranging from appliances, to home repairs, to fixtures, to automobiles, to concert tickets, to automobiles, to antiques, to collectibles, to used cars, to computers, to real estate, and many others.

Also, once systems and methods are established whereby an option or future may be defined, offered and sold, the same systems and methods can be used as a secondary marketplace for the options or futures, as well as for the underlying goods, services, information and other items to which the options and futures relate.

BRIEF DESCRIPTION OF THE FIGURES

FIG. 8 is a schematic diagram illustrating a table for storing and ranking bids in accordance with an embodiment of the invention.

DETAILED DESCRIPTION OF THE INVENTION

Disclosed herein is a system for allowing a remote user to purchase, over a distributed computer network (e.g., the Internet), an option to purchase a ticket, goods or services, or other item that is based on a contingent event, e.g., an event which is certain to occur but for which the participants, content and/or location(s) are not predetermined. For instance, the subject system can be used to sell options for the purchase of tickets or accommodations for such contingent sports events such as playoff games on the basis of what teams qualify, or who may appear in an all-star game. In general, the system comprises a host server operative with a program including: (i) an event database connected in communication with said host server, said database including contingent event identifiers, such as team-round-game identifiers, each identifier being representative of an ticket or other good or service for a contingent sporting event within a range of possible sporting events, (ii) an option bid database in communication with said host server, said option bid database including allocation fields representative of an option bid for each of the tickets, goods or services to be made available upon occurrence of a contingency, and (iii) an interface manager implemented on said server and in communication with said databases, wherein said interface manager processes option bids from remote users to determine whether to accept the option bid and to update the allocation field.

Figure 1:
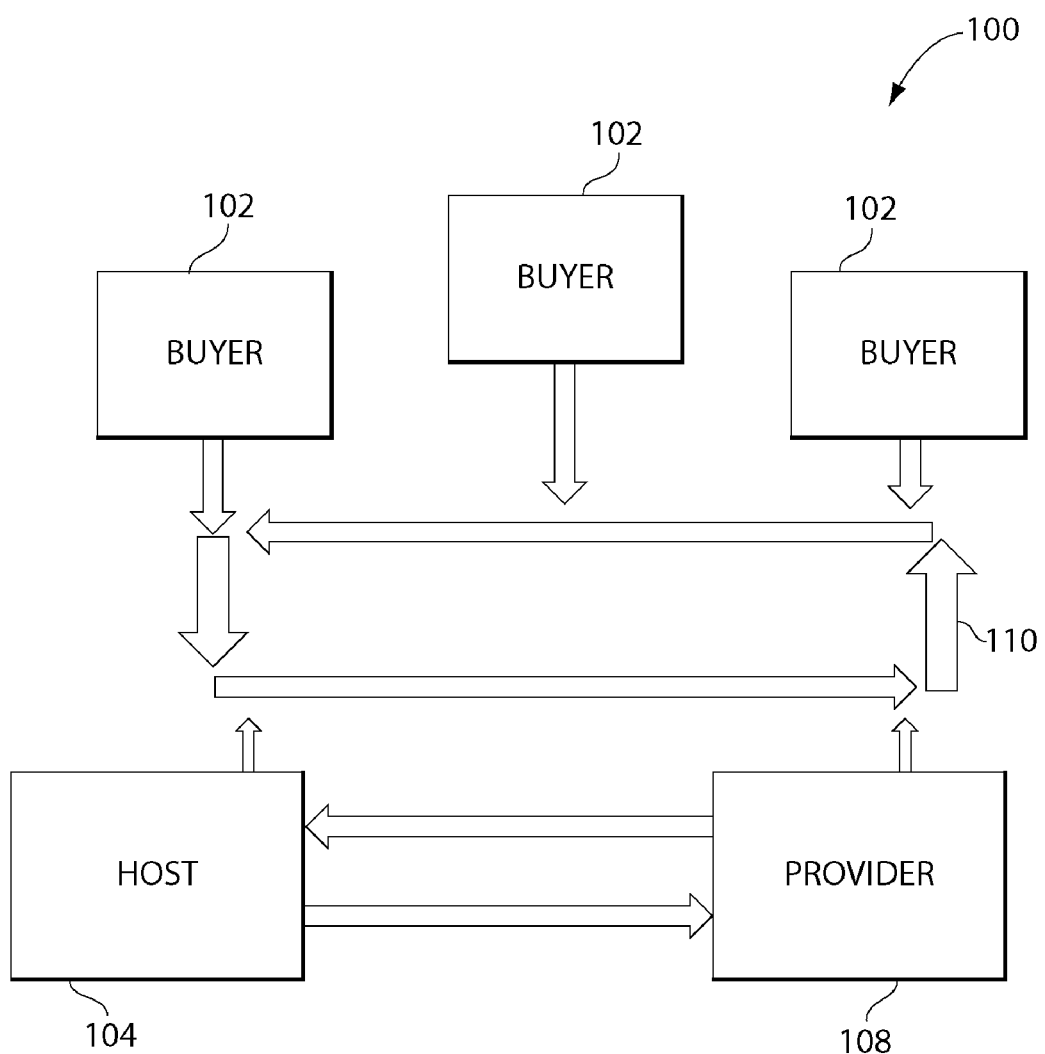
FIG. 1 depicts a schematic of the entities involved in an embodiment of a methods and systems disclosed herein.

Referring to FIG. 1, the entities involved in an embodiment of a method and system disclosed herein are depicted in schematic format. In a system 100, a plurality of buyers 102, a provider 108 and a host 104 are connected via a network 110. It should be understood that any number of buyers 102, hosts 104, and providers 108 could participate in such a system 100. In an embodiment, the network 110 may be a wide area computer network, such as the Internet.

To further illustrate, an example of a client-server system interconnected through the Internet 100. In this example, a remote server system is interconnected through the Internet to client system. The buyer system 102 can include conventional components of a client system, such as a processor, memory (e.g. RAM), a bus which couples the processor and memory, a mass storage device (e.g. a magnetic hard disk or an optical storage disk) coupled to the processor and memory through an I/O controller and a network interface, such as a conventional modem. The server system can also include conventional components such as a processor, memory (e.g. RAM), a bus which couples the processor and memory, a mass storage device (e.g. a magnetic or optical disk) coupled to the processor and memory through an I/O controller and a network interface, such as a conventional modem. It will be appreciated from the description below that the present invention may be implemented in software which is stored as executable instructions on a computer readable medium on the client and server systems, such as mass storage devices, or in memories.

In an exemplary embodiment, a browser, residing on the computer of buyer 102, displays a home page retrieved from the World Wide Web on a viewing device, e.g., a screen. A user can view this page by entering, or selecting a link to, a Universal Resource Locator (URL), such as "www.playoffquest.com", in a browser program, such as MICROSOFT EXPLORER or NETSCAPE NAVIGATOR, executing on the buyer's computer. Note that the subject online system 100 may reside in a server or in a combination of servers.

Focusing now on the network 110, the presently preferred network is the Internet. The structure of the Internet is well known to those of ordinary skill in the art and includes a network backbone with networks branching from the backbone. These branches, in turn, have networks branching from them, and so on. For a more detailed description of the structure and operation of the Internet, please refer to "The Internet Complete Reference," by Harley Hahn and Rick Stout, published by McGraw-Hill, 1994. However, one may practice the present invention on a wide variety of communication networks. For example, the network 104 can include interactive television networks, telephone networks, wireless data transmission systems, two-way cable systems, customized computer networks, interactive kiosk networks and automatic teller machine networks.

In addition, the network 110 can include online service providers, such as Microsoft Network, AMERICA ONLINE, PRODIGY and COMPUSERVE. In a preferred embodiment, the online service provider is a computer system which provides Internet access to a buyer 102. Of course, the online service providers are optional, and in some cases, the buyers 102 may have direct access to the Internet.

In its present deployment, the Internet consists of a worldwide computer network that communicates using well defined protocol known as the Internet Protocol (IP). Computer systems that are directly connected to the Internet each have an unique Internet address. An Internet address consists of four numbers where each number is less than 256. The four numbers of an Internet address are commonly written out separated by periods such as 192.101.0.3. To simplify Internet addressing, the "Domain Name System" was created. The domain name system allows users to access Internet resources with a simpler alphanumeric naming system. An Internet Domain name consists of a series of alphanumeric names separated by periods. For example, the name "www.optionbid.com" corresponds to an Internet address. When a domain name is used, the computer accesses a "Domain Name Server" to obtain the explicit four number Internet address.

To further define the addresses of resources on the Internet, the Uniform Resource Locator system was created. A Uniform Resource Locator (URL) is a descriptor that specifically defines a type of Internet resource and its location. URLs have the following format:

resource-type://domain.address/path-name where "resource-type" defines the type of Internet resource. Web documents are identified by the resource type "HTTP" which indicates that the hypertext transfer protocol should be used to access the document. Other resource types include "ftp" (file transmission protocol) and "telnet". The "domain.address" defines the domain name address of the computer that the resource is located on. Finally, the "path-name" defines a directory path within the file system of the server that identifies the resource.

To access an initial Web document, the user enters the URL for a Web document into a Web browser program. The Web browser then sends an HTTP request to the server that has the Web document using the URL. The Web server responds to the HTTP request by sending the requested HTTP object to the client. In most cases, the HTTP object is an plain text (ASCII) document containing text (in ASCII) that is written in HyperText Markup Language (HTML). The HTML document usually contains hyperlinks to other Web documents. The Web browser displays the HTML document on the screen for the user and the hyperlinks to other Web documents are emphasized in some fashion such that the user can selected the hyperlink.

Focusing now on the buyer 102, the buyer system may be a general purpose computer. In a preferred embodiment, the buyer 102 is equipped with a conventional personal computer equipped with an operating system supporting Internet communication protocols, such as Microsoft Windows 95 and Microsoft Windows NT, a browser, such as MICROSOFT EXPLORER or NETSCAPE NAVIGATOR, to access the present system and a modem, wireless connection (such as infrared link or satellite dish) or other mechanism for access to the network 110. In other embodiments, the buyer 102 could, for example, be a computer workstation, a local area network of computers, an interactive television, an interactive kiosk, a personal digital assistant, an interactive wireless communications device or the like which can interact with the network. While the operating systems may differ in such systems, they will continue to provide the appropriate communications protocols needed to establish communication links with the network 110.

Figure 2:
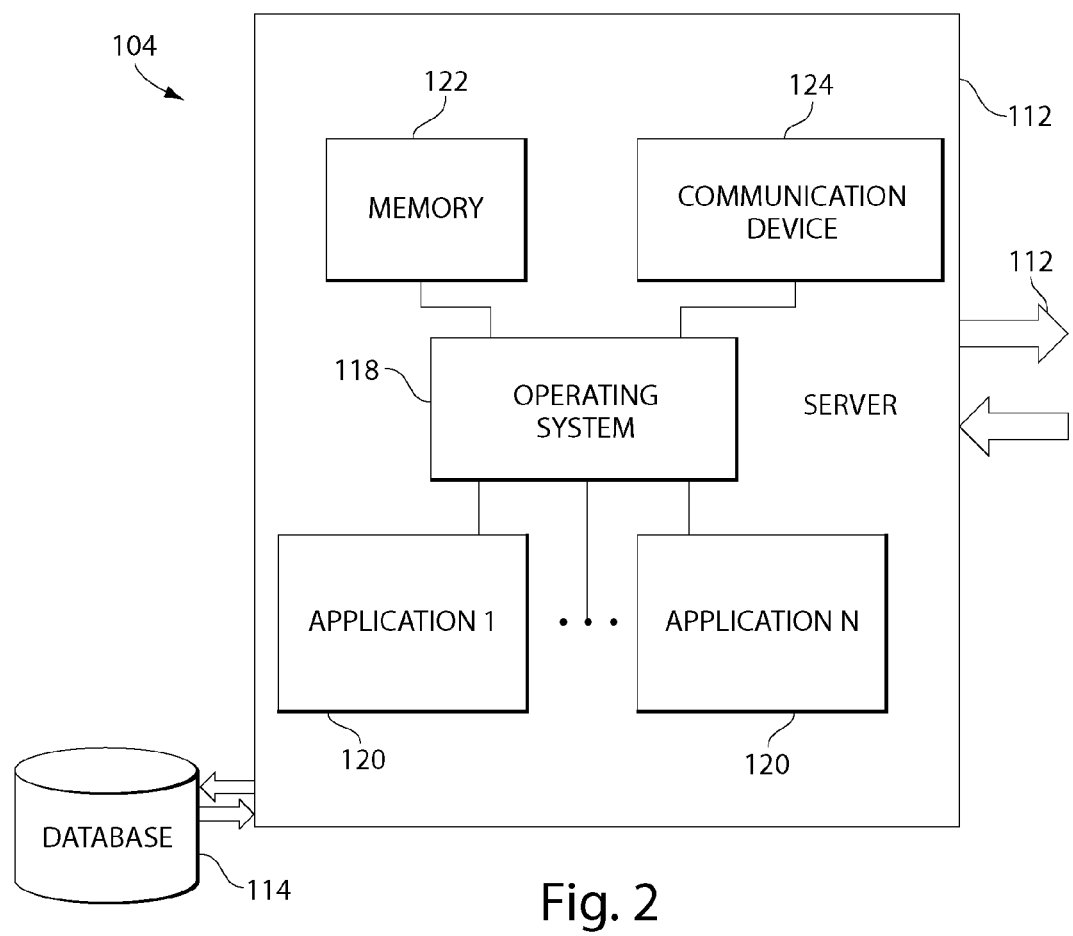
FIG. 2 depicts a host system of an embodiment of the methods and systems disclosed herein.

Referring to FIG. 2, the host 104 may include a server 112 which communicates with one or more databases 114. The server 112 may be an HTTP server or other server capable of a communication connection, such as a connection to the Internet. In such embodiments, the server 112 can include a dynamic page generator, HTML structures, a database module, an action manager, and an order processing module having an order engine, an order pipeline, and components for various purposes, such as calculating sales tax and shipping/handling fees. The dynamic page generator can use, e.g., HTML structures and communicates with the database module to access data from the database(s) to format and display on the buyer's browser. The order processing module communicates with the dynamic page generator and the database module to create Web pages having product information, e.g., ticket option data, for display on a buyer 102. Similarly, the order processing module communicates with the auction manager and the database module as needed to execute purchasing transactions for the ticket options. Lastly, the order processing module can includes various components, that is, a plurality of application programs to enhance and administer the system. For example, the components can include applications to interface with commercial banking systems, to calculate shipping/handling, to determine applicable taxes and to post payments to various bank accounts.

The server 112 may include conventional computer components, such as an operating system 118, which may execute a variety of application programs 120. The server 112 may include memory 122 and a communications device 124, such as a modem or network interface card. The communications device 124 may provide a communications connection 128 for connection to the network 110 of FIG. 1 The host 104 may, in an embodiment, host a site on the Internet or other computer network. The host 104 may thus execute various conventional computing functions, such as data processing and file storage, manipulation and retrieval. The server 112 may access the database 114, which may be internal to the server 112 or may be a separate database. The database 114 may be at a remote location from the server 112 or may be at the same location as the server 112. In a preferred embodiment, the database(s) 114 comprises data stored locally in one or more storage devices, such as a magnetic disk drive or an optical disk drive. In another preferred embodiment, the database(s) 114 comprises data distributed across a local area network (LAN) or a wide area network (WAN). For example, the database 114 might be a third party database that is accessed by the server 112 through the network 110 or through another communications connection, such as a dedicated line. The database(s) 114 may include query data, ticket information, order information, buyer information, receipts data and the like.

In an embodiment, the server 112 hosts a web site, in which case the server 112 could include application programs 120 capable of enabling a buyer 102 to interact with the server 112 through a web browser or similar application, via the network 110.

In certain preferred embodiments, the system uses templates, directives and actions to dynamically respond to buyer's bids or requests. Templates, which include directives and actions, can be located in the HTML structures. In response to browser requests, the dynamic page generator composes HTML pages dynamically from templates stored in the HTML structures. In a preferred embodiment, the buyer 102 invokes the dynamic page generator by selecting a URL. The system interprets the URL by analyzing its constituents to identify a template and its arguments. Thus, an "HTTP://" portion of the URL specifies use of the HyperText Transfer Protocol (HTTP) for communication across the Internet.

A template defines the appearance of a page. Templates include HTML and directives, which are keywords to the dynamic page generator specifying how to build a page for display, such as what data to insert into the page and what queries to run against the database to obtain data for display on the page. A template may also include a wide variety of content, such as ActiveX controls, Visual Basic Scripts, forms, images, video and sound.

In a preferred embodiment, the system includes several predefined templates in the HTML structures. For example, a "welcome.html" page serves as a logon page for consumers. Similarly, a "register.html" page provides a form for a new consumer to enter registration information. An "update.html" page likewise provides a form for consumers to update their registration information. A "purchase.html" page presents the order total and provides a form for entry of credit card payment information. To confirm purchases, a "confirmed.html" page presents a message confirming completion of the purchase transaction. Similarly, a "receipt.html" page presents a summary of the order in the form of an online checkout receipt. In addition, a "detail.html" page presents a detailed line item receipt for options ordered.

To perform various system operations, the system uses actions. For example, actions can add an item to an order form, clear an order from, and initiate a bid for options or futures for tickets, goods, services, information or other items associated with a contingent event, from the database. An action is a routine to perform specific functions. Actions have return values that control the display of results to a buyer 102 or other operator. Similarly, actions take arguments that control their behavior. Some actions generate errors when they receive incorrect arguments while other actions process and validate the arguments they receive. Many action arguments have default values to use when no values are specified. After execution of an action and its resulting system operation, the action may cause display of an HTML page having information, such as confirmation information or error information resulting from execution of the action, or the action may redirect the buyer 102 to a new HTML page.

During a session, the buyer 102 sends requests, e.g., embedded in URL addresses, to the system. The system responds to these embedded requests with HTML documents. The HTML documents may contain, for example, registration information, product offerings, promotional advertisements, orders, bids, requests and receipts. The page generator composes the HTML documents sent to the buyer 102. The system provides a set of HTML pages dynamically generated from queries to a database having store information, such as inventory data for various contingent events, such as ticket inventory and prices, advertising copy, pricing, customer information, promotions or the like.

Figure 10:
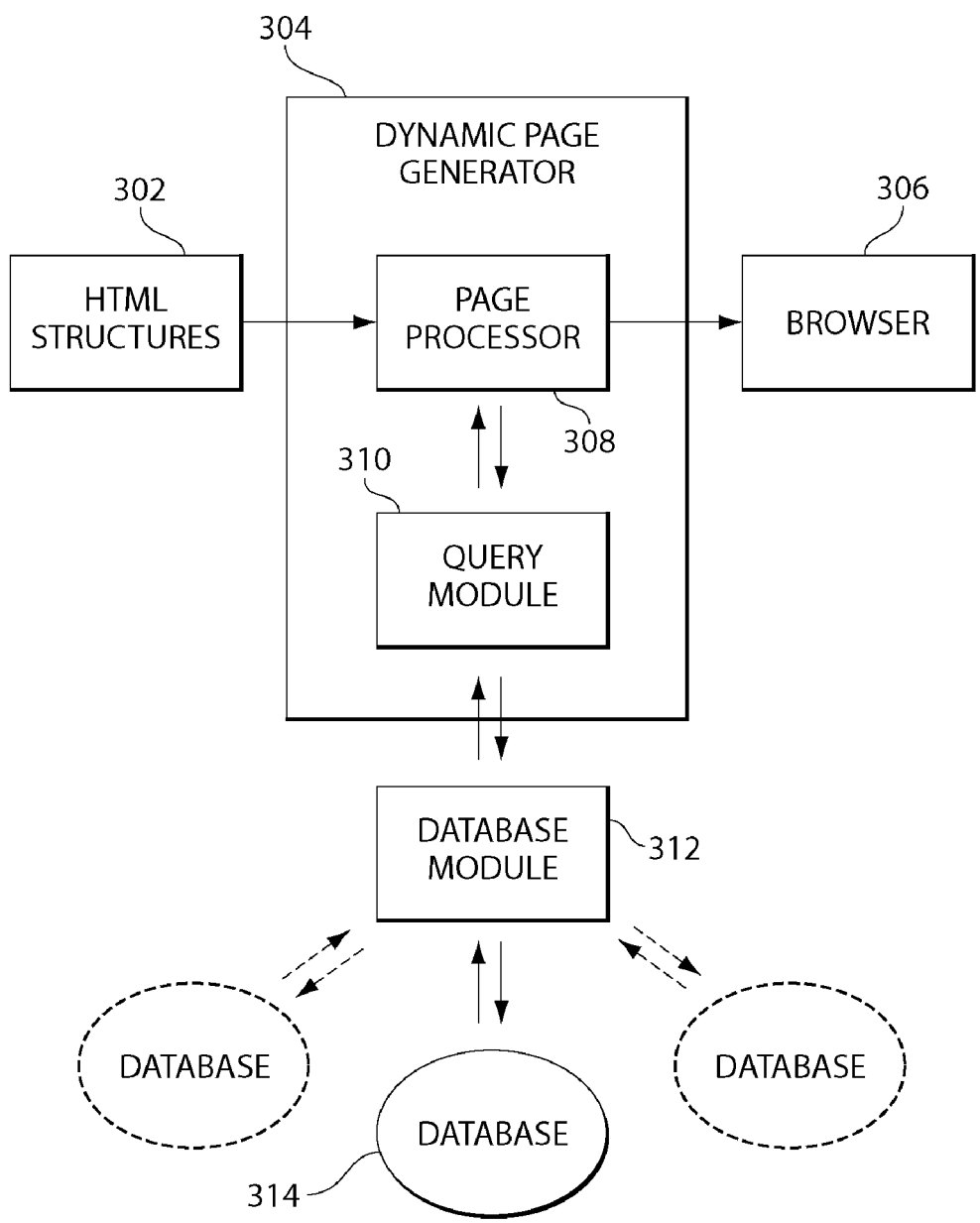
FIG. 10 is illustrates the structure of a dynamic page generator in accordance with an embodiment of the invention.

FIG. 10 illustrates one embodiment of a dynamic page generator 1004. In a preferred embodiment, the dynamic page generator 1004 includes a page processor 308 and a query module 310. The page processor 308 retrieves and parses a template from the HTML structures 1002 to form an HTML page for display on the browser 306, e.g., of a user 102. In parsing the HTML template, the page processor 308 communicates with the query module 310 as needed to extract and format information from the database(s) 312 to display on the browser 306. For example, the template can provide a query, such as the name of a team or other contingency event, or a bid price for a specified option or the like, to the query module 310. The query module 310 then passes this query to the database module 312. In the instance where the query is a participant name or contingent event name, the database module 312 uses the query to retrieve information related to query from associated databases 314 and then passes that query to the database module 312 for execution. In embodiments wherein the query is a bid for a specified option, the database module 312 retrieves from associated databases 314 (such as an option bid database) information related to other bids for the specified option, and then passes that information to the database module 312 for execution.. In that embodiment, the database module 312, or other sub-system of the present system, can compare the queried option bid to returned data from the option bid database to determine if the bid should be accepted. In a preferred embodiment, the database 314 is a relational database that processes queries in the SQL data sublanguage. The database 314 in turn executes the query and returns the query results to the database module 312 to produce an access object having the query results. The database module 312 returns the access object having the query results to the query module 310. The page processor 308 obtains the access object from the query module 310 and processes the access object to extract and format the query data to prepare HTML for display on the browser 306.

The present system may also include a financial transaction settlement sub-system. The financial transaction settlement sub-system processes various modes of payment for accepted options, e.g., including processing credit card authorization requests, debit card purchase requests, electronic money ("e-money") requests, or other such financial transaction request. For example, the financial transaction settlement sub-system may represent commercially available credit card processing institutions.

Figure 3:
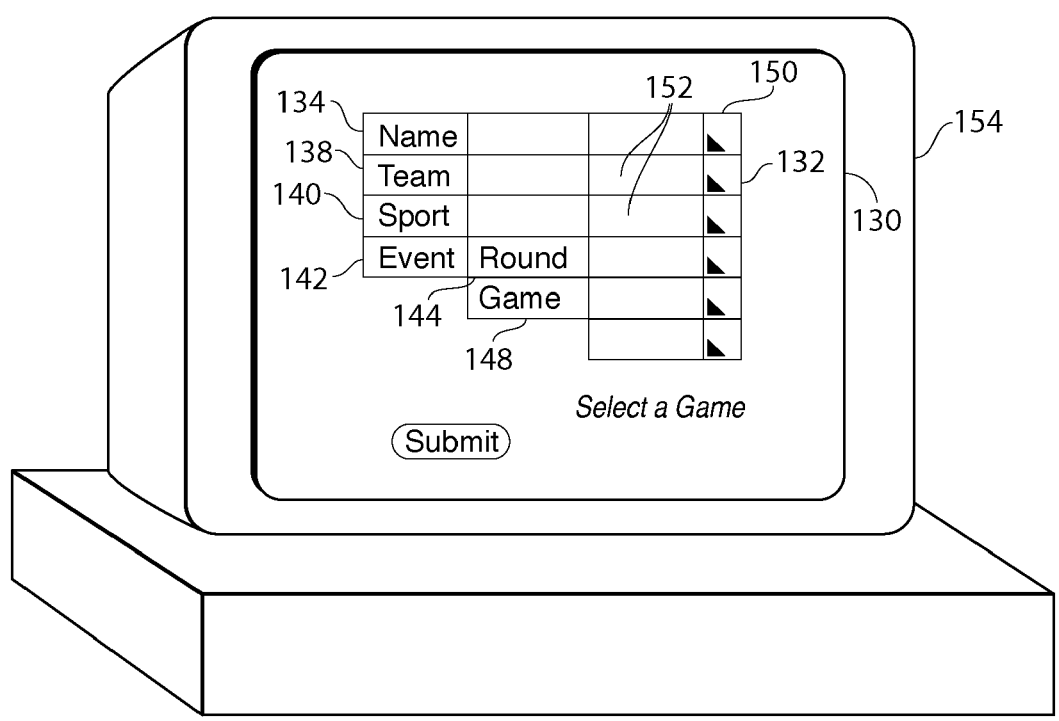
FIG. 3 depicts an embodiment of a buyer's device for using an embodiment of the methods and systems disclosed herein to purchase an option to purchase a ticket to an event.

Referring to FIG. 3, in an embodiment, the server 112 hosts a web site that enables buyers 102 to purchase options to purchase tickets to contingent events, such as contingent sports events. Buyers 102 may interact with the site via a buyer device 154, which may be any device capable of an Internet connection, such as a personal or laptop computer running a web browser application, such as NETSCAPE NAVIGATOR, MICROSOFT EXPLORER, or the like. The buyer device 154 may include a graphical user interface 130, which appears on the screen of the buyer device 154 and through which the buyer 102 may interact with the site. In an embodiment, the buyer device 154 permits the user to enter information relating to a sports event for which the buyer 102 wishes to purchase an option to purchase one or more tickets. The information may be entered by the buyer 102 in any conventional data processing format. In the embodiment of FIG. 3, the user may enter the information via a template 132, which may be an HTML template, JAVA applet, or other conventional mechanism for permitting user entry. The entry of the data could be via pull-down menus, clicking on a series of icons, or other mechanism. The buyer-entered information may vary, depending on the sporting event, as described below.

In an exemplary embodiment, the buyer may enter information relating to a series of fields 134, 138, 140, 142. Each field 134, 138, 140, 142 may correspond to data stored in the database(s) 112 of FIG. 1. The buyer may enter data for each field in a series of template fields 152, each corresponding to one of the fields 134, 138, 140, 142. The buyer may type in an entry in the template field 152, or may select from available choices via a pull-down arrow or menu 150 for each field. Clicking the pull-down arrow, in a conventional manner, would result in the display of a list of available options in a list. The buyer 102 could thus enter the buyer's name in the template field 152 corresponding to the name field 134. The buyer 102 could select a contingent event, in this case a sports event, in the template field 152 corresponding to the sport field 140. The buyer 102 could select a particular team for the team field 138. The buyer could then select a particular event for the event field 142.

In the case of a sporting event, the event field could offer choices of specific games 148, specific rounds 144, or specific combinations of rounds 144 and games 148. Thus, through use of the menus or other entry means, the buyer could identify a potential game for which the buyer may want a ticket or travel accommodation, linked to the presence of the buyer's team in the game. For example, a buyer could select an option to purchase a ticket for a first round NFL playoff game in which the Denver Broncos play. The option to purchase the ticket could mature in an event-driven manner. In particular, the option could be made exercisable only if the selected team appeared in the selected game.

The option may also include, or be for, an event requiring travel. In certain embodiments, the airfare may be calculated in advance, such that the cost is identified to the buyer in advance, e.g., as an entry in a web-page of the site. In other embodiments, the buyer may specify that the option is also contingent on the airfare being less than a certain amount.

Depending on the sport, a wide range of events or combinations of events could serve as triggers for exercisability of an option for tickets, transportation or other accommodation. Examples of events would include presence of a buyer's selected team in a game, presence of a particular pair of teams in a game, presence of a team or combination of teams in a game having a predetermined proximity to the buyer, existence of a game involving a particular team or combination of teams occurring on a specific date, and the like. It should be understood that while the present disclosure refers to the presence of a particular team in a particular game as the primary contingency upon which an option or future may be based, other contingency events can be envisioned. For example, a fan's loyalty may be to a particular player, rather than to a particular team. In that case, a fan could purchase an option for a ticket to a particular game if that player was to appear in the game. Such an option might be appropriate for ticket and accommodations at tournaments in individual sports, such as tennis and match-play golf, and for all-star or all-pro games in other sports, such as baseball, football, basketball, soccer and hockey. Thus, for example, a buyer 102 could purchase an option to have a ticket to the women's U.S. Open final, if the match involves Monica Seles, or a ticket to the baseball All-Star game, if Pedro Martinez is an All-Star.

In still another embodiment, the option for tickets, travel and/or hotel accommodations may be contingent upon availability of resources, weather or any other condition which may effect the desirability to travel to the location.

In one embodiment of the invention, the contingency event is related to weather. It can be predicted that weather will be relevant to a wide range of goods, services, and activities, but the weather itself cannot be predicted with a high range of long-term accuracy. Thus, a buyer 102 could purchase an option or futures contract for delivery of a weather-dependent good or service, with the purchase contingent upon the occurrence of a measurable weather event at a given time. Weather-dependent goods and services that could be made the subject of weather-contingent options and futures contracts include, but are not limited to air travel, skiing, weddings, parties, concerts, sports events, vacation packages, hotel reservations, all outdoor events and activities, hiking, camping, golf, surfing, swimming, amusement park attendance, and many others.

Thus, for example, travel or ski packages (travel, hotel, lift tickets, etc) for spring skiing trips may be optioned based on snow base for a resort for a particular time of the year, e.g., the buyer may wish to travel to a ski resort in the month of May if there is at least a certain number of trails open, a certain minimal snow base (e.g., a pre-determined minimum amount of snow on the selected mountain a given number of days before the date of the ski trip), or other objective criteria for determining when, if at all, the option is exercisable. Likewise, a buyer could purchase an option to purchase a vacation package to a Caribbean island, contingent on the absence of any hurricanes in the Atlantic ocean one week before the date of departure.

The options would allow buyers to purchase with diminished uncertainty, while sellers would have advance notice of potential demand. As with sports event options described above, the advance notice would permit planning, marketing of related goods and services, and, in some cases, the sale of multiple options for the same good or services. For example, many individuals are highly interested in bad weather. For example, a weather expert, newsperson, or weather buff might have a strong desire to have the opportunity to observe a hurricane close hand, while a vacationer might have no desire to vacation during the same storm. Thus, an option or futures contract for a travel package could be sold to each of them, with the former getting the package if a hurricane was identified as being within a given distance from the location at a given time, and the latter getting the package otherwise. Similarly, many non-ski attractions have arising around ski resorts, such as outlet shopping, family entertainment complexes and the like. However, during the peak season, price rise, and non-skiers typically avoid these locations. If there is no snow, there is substantial unused capacity at a given time. In order to help fill the unused capacity, options and futures contracts can be established to permit one person (presumably a skier) to have a hotel room, dinner reservation, or the like if there is a predetermined amount of snow and to permit another person (presumably a non-skier) to have the same item (presumably at a "non-peak" price) if there is less than the predetermined amount of snow. In other words, the systems and methods enable vendors to offer the same item to different individuals, depending on different tastes for weather-related goods and services. Weather related options and futures contracts would be particularly effective in booking off-peak times, such as early and late season skiing, golf, beach vacations, and the like. Thus, vendors could identify interested parties who would commit to purchase a package of items if the weather, as of a given date, is appropriate for the particular activity. For example, a skier could commit to a ski package in October or May, which would be contingent on the presence of snow. Knowing the skier might arrive, the vendor could target advertising for a host of related products and services, even if the skier doesn't end up purchasing the package.

In other embodiments, the contingent event may consist of a blending of one or more contingencies, including any of the contingencies identified herein. Thus, for example, a skier might purchase an option to acquire a hotel room and lift ticket on a particular mountain in May, if there is adequate snow, and if the price is lower than a predetermined amount.

The available options may be subject to constraints, which may be particular to, e.g., the sport or other event underlying the desire of the buyer to the option. For example, a buyer could not purchase an option for a ticket for an American Football Conference playoff game involving the Green Bay Packers, because the Green Bay Packers are in the National Football Conference, not the American Football Conference. Another constraint may be the number of options, such as the number of guaranteed tickets that the host can deliver.

In certain preferred embodiments where the host has limited number of tickets or hotel accommodations available, the host will not permit the purchase of more options than can be actually be delivered by the host, assuming any possible combination of events occurs. For example, if host has contracted for 4000 tickets to the SUPER BOWL, the host will preferably not sell options that would result in a commitment to sell more than 4000 SUPER BOWL tickets. In this simple scenario, options could be made exercisable based only on the presence of a buyer's designated team in the SUPER BOWL. In one embodiment, if the host is capable of delivering N tickets to a play-off game, the host can sell N/2 options to buyers designating each team that can appear in the game. Thus, if the host is capable of delivering 4000 tickets to the SUPER BOWL, then the host can sell options to purchase up to 2000 tickets to buyers designating each particular team. Of course, in another embodiment, all 4000 tickets could be optioned to every team, and the 4000 highest bids from amongst all the buyers (e.g., all 8000 option holders) for both teams making the SUPER BOWL are selected.

It should be understood that the number of tickets the host is capable of delivering may be constrained not only by the number of seats in the stadium or on a plane, but by other factors, such as the ability of the host to obtain the tickets for delivery. In a preferred embodiment, the host may obtain pre-commitments for tickets for a given number of seats, N. A conservative approach would be to sell options to purchase N/2 seats to buyers designating each particular team for appearance in the game. One of the benefits of the system to the host and to providers of tickets may be observed, which is that in addition to ultimately selling N tickets to the game, the host and provider sell up to a number of options equal to (N/2) times the number of teams.

Figure 4:
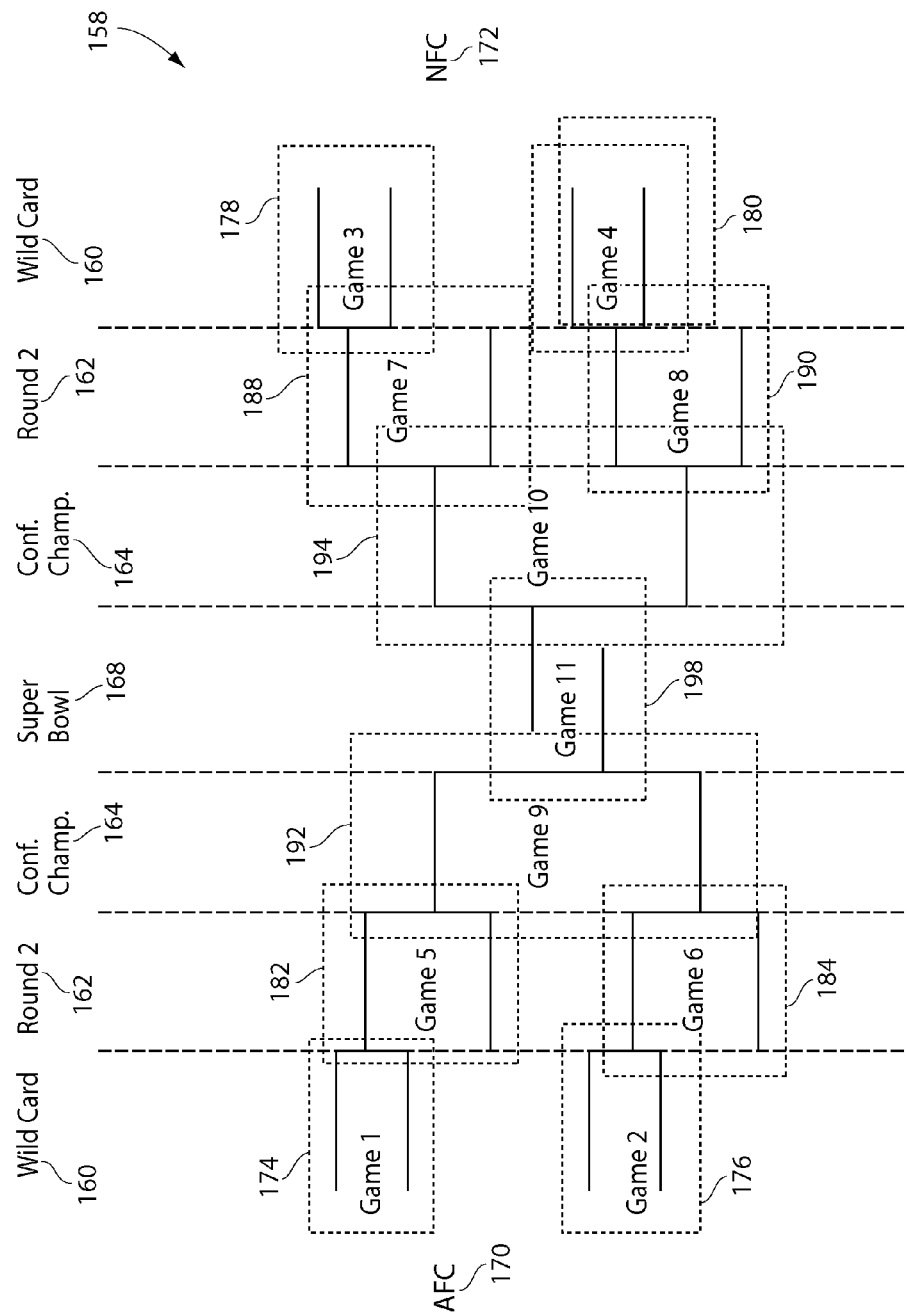
FIG. 4 is a schematic depiction of a round of the National Football League playoffs.

Additional event combinations and option triggers can be employed in scenarios that are more complicated than sale of options to purchase options to a single game. For example, a buyer may wish to have tickets to a game in a particular round of playoffs, if the buyer's designated team is in that round, although it may be impossible to know in advance the location of the game. Referring to FIG. 4, a schematic diagram 158 depicts the NATIONAL FOOTBALL LEAGUE playoff format. It should be understood that variations in format can be accommodated by the systems and methods disclosed herein, and that the systems and methods are not limited to a particular sport or tournament format. The playoffs are divided into a number of rounds, including a wild card round 160, a second round 162, a conference championship round 164 and the SUPER BOWL 168. There are two conferences, the AMERICAN FOOTBALL CONFERENCE, of AFC 170, and the NATIONAL FOOTBALL CONFERENCE, of NFC 172. Each conference 170, 172 has the wild card round 160, the second round 162 and the conference championship 164. The winner of each single game in each round advances to the next round. Although the playoffs are depicted as having a predetermined path of games, in fact the matching of teams for the games for the second round 162 are determined in part based on the results in the wild card round 160. Among other things, the NFL seeks not to match teams from the same division in the second round 162, where possible.

Each of the rounds 160, 162, 164 can be divided into a set of games. The wild card round 160 has two AFC conference games 174, 176 and two NFC conference wild card games 178, 180. Each of the games can be given a unique identifier, or the games can be grouped together as "AFC round one" and "NFC round one" games. Thus, a buyer could, in advance, purchase an option for a ticket to a wild card round game, if the buyer's team appears in the wild card round. Allocation of options for rounds, rather than a single game, such as one or more of "Game 5" 182, "Game 6" 184, "Game 7" 188, "Game 8" 190, "Game 9" 192, "Game 10" 194, and "Game 11" 198, introduces additional complexity to the allocation scheme. The host or provider must determine not only the number of options that it has to sell for the round, but also the different combinations of teams that could appear in the round and the different locations that could host games. A variety of conservative approaches would permit allocation of options in a manner that would not result in a conflict. The most conservative approach would be to treat each option as, e.g., a committed ticket. This would still offer benefits, because not all options would likely be exercised, given the actual teams that make it to the wild card round, but the benefits would be much lower than a system that allows multiple options for the same ticket. Another approach would be to sell options for N/2 seats to buyers from each team, where N is equal to the smallest number of committed tickets that the host has from any of the games in the round. In situations such as the NFL, the two conferences could be treated separately, since a team from one conference would not make the playoffs for the other conference. A similar approach could be taken with each round.

To give effect to the type of option just described, the concept of a team-round identifier can be introduced. Thus, an option can be made exercisable based on the presence of a given team in a given round, and allocations can be made based on the possible combinations of teams in the games of the round.

In another embodiment, options to purchase tickets could be sold for home games of the buyer's designated team. This would avoid the complication of having to limit sales to half of the number of tickets for each team, which could result in one team's options selling out, but the other team's options remaining largely unsold. A team-round-home game identifier can be introduced. The option would be exercisable based on existence of a home game for a designated team in a particular round of playoffs. Option allocations could be made based on the possible combinations of teams appearing in a particular team's home games.

In another embodiment, buyers could purchase options for a particular team's appearance in a particular round at a particular location or set of locations. Adding a location element would be more complicated than the scenario in which only home game options are sold, but it would offer more flexibility to the buyer. A team-round-location identifier can be introduced, based on which options would be exercisable if a team appears in a specified round in a specified location or locations. Allocation of options could be made based on possible combinations of teams in a given round at given locations.

In another embodiment, options to purchase travel accommodations could be sold only for away games of the buyer's designated team.

It should be understood that the systems and methods disclosed herein are not limited to a particular type of contingent event or sport. By way of example, and without limitation, the systems and methods could be used to sell options to NATIONAL BASKETBALL LEAGUE games, NATIONAL HOCKEY LEAGUE games, MAJOR LEAGUE SOCCER games, MAJOR LEAGUE BASEBALL games, soccer games from leagues throughout the world, games for soccer cups and tournaments, such as the World Cup, FA Cup, European Cup, MLS Cup, and the like, college sports, such as the Men's and Women's NCAA basketball playoffs, tennis and golf tournaments, and other events.

In situations such as the NBA playoffs, an additional complication is introduced in that multiple games appear in each round. The first round of playoffs is a best-of-five series, and the other rounds are best-of-seven series. Thus, in place of a team-round identifier, a team-round-game identifier can be introduced, permitting the buyer to purchase an option, for example, to have guaranteed tickets and/or airfare to attend a game involving the Los Angeles Lakers in the seventh game of the NBA finals. The option would be triggered based on the presence of the existence of the identified game, in the identified round, with the identified team. The allocation would, as in other embodiments, be based on the possible combinations of teams, rounds and games. As in other embodiments, an option purchase could be made available that is limited to home or away games, and then to games in locations within a given proximity of the user.

It should be understood that the sale of options is not necessarily limited to playoff games. In fact, some of the benefits of the systems and methods disclosed herein can be obtained with any game where the desirability to attend varies over time. For example, a late-season baseball game between the Red Sox and Yankees would be much more attractive if both teams were in playoff contention than if one or the other was not in contention. Options could be sold that would enable to buyer to obtain a tickets if a particular combination events occurred that would make attending the game more attractive to the buyer. For example, the buyer could indicate that s/he wishes to have an option to a ticket(s) for a Red Sox-Yankees game (optionally in a specific location) on a given date if both teams are in contention for the American League East division title.

In an embodiment, the invention includes a method of electronic commerce, comprising establishing a network-based on-line system for purchase and sale of options to acquire tickets and travel accommodations, such as airline tickets, to destinations for a given sporting events.

Figure 5:
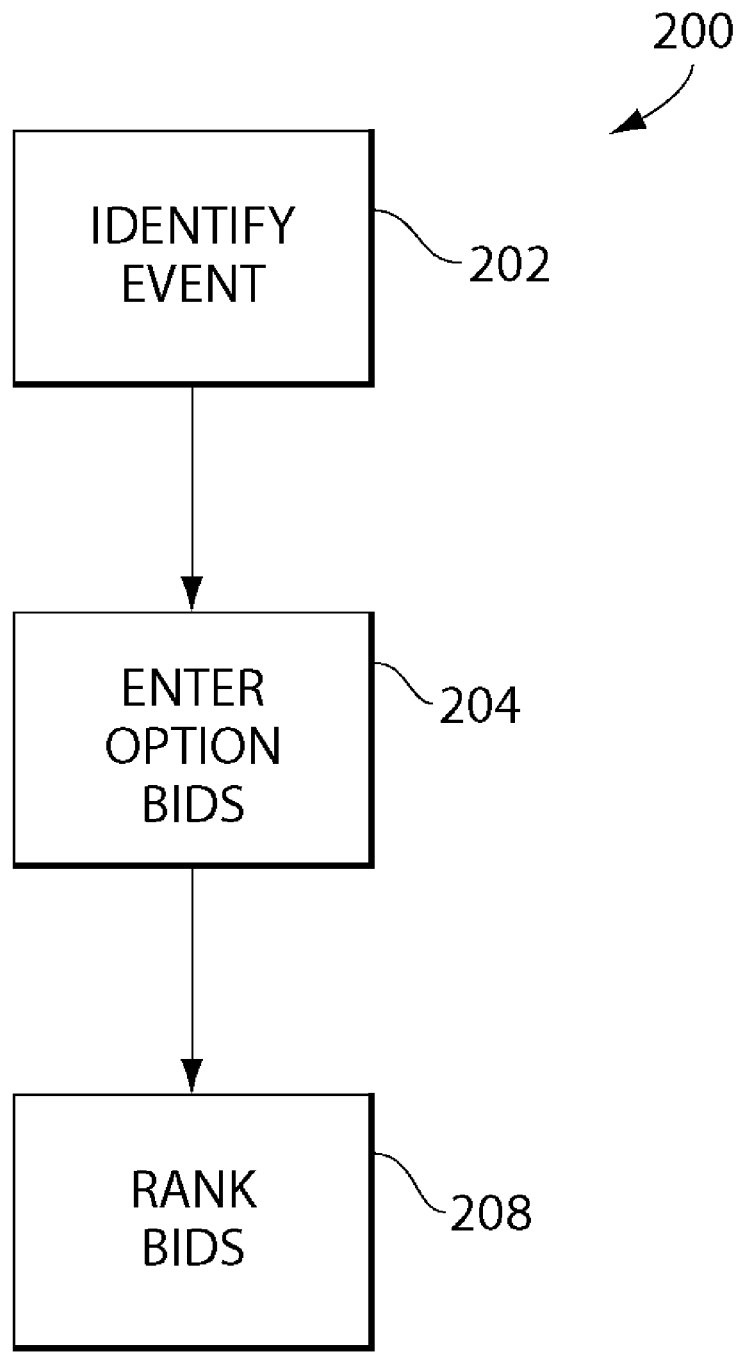
FIG. 5 is a flow chart illustrating steps involved in accepting and ranking a bid for an option or futures contract for a sporting event ticket or related good or service.

In a preferred embodiment, a system is provided for allowing user to purchase an option for a ticket to a playoff sporting event. Referring to FIG. 5, a flow chart 200 depicts the steps by which the system may permit a buyer to buy an option. First, at a step 202, the user may identify an event. For example, the user may identify a team-round-game combination as a trigger event for the right to purchase a ticket, preferably at a price set at the time the option is purchased. Next, at a step 204, the system may enter the option bid into a location in memory for bids for that event, e.g., team-round-game. Next, at a step 208, the system may process the option bids. The identification, entry and ranking of bids may be accomplished by a variety of conventional data processing methods and systems. Many such systems are known and in use, such as systems and methods for electronic auctions.

Figure 6:
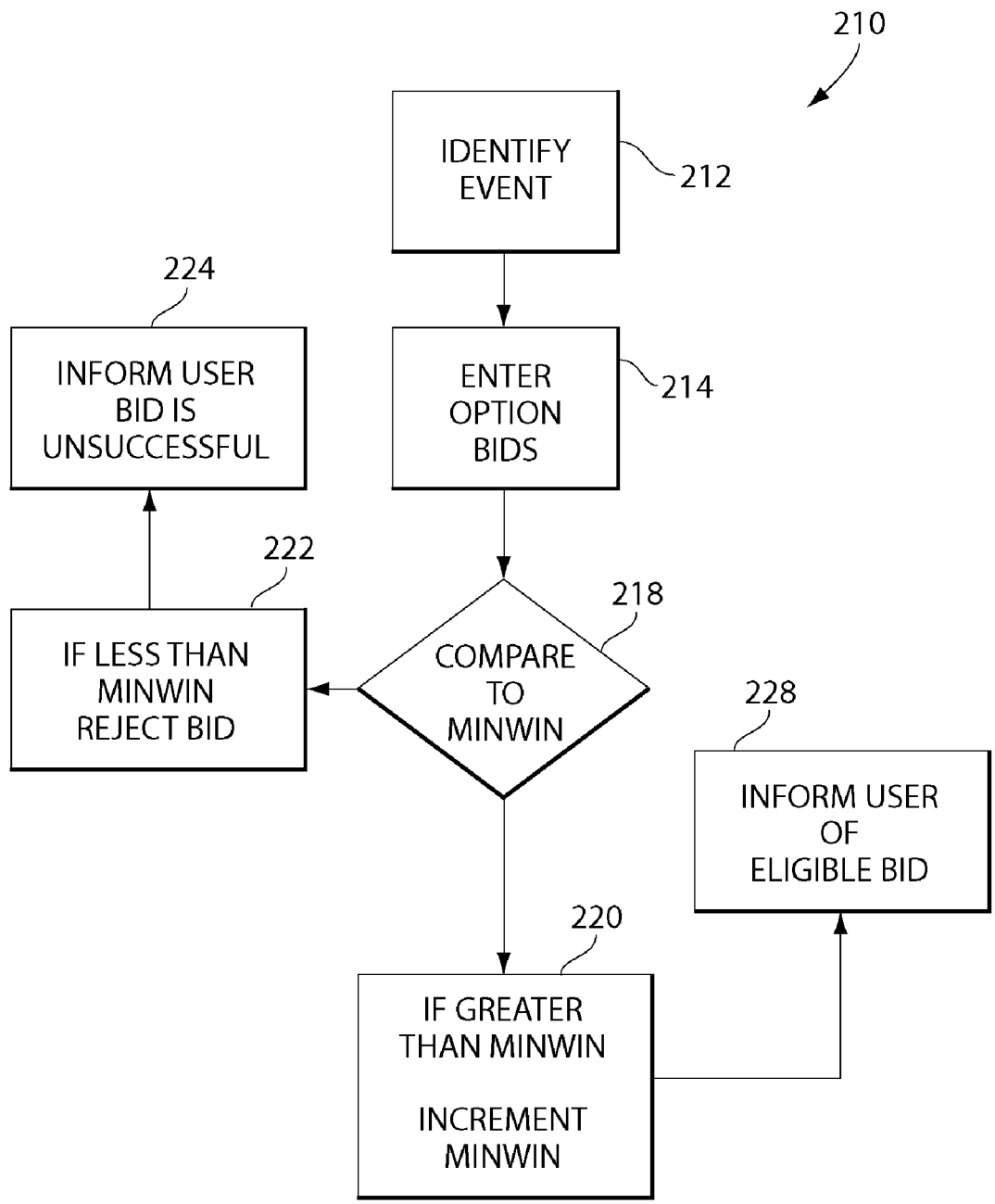
FIG. 6 is a flow chart illustrating steps for allocating options and futures according to an auction format in accordance with an embodiment of the invention.

Referring to FIG. 6, in an embodiment, the ranking may consist of a comparison of bids for the available tickets to a team-round-game in an auction format, so that the user is informed whether, after submission, the bid is the highest current bid. Thus, in the flow chart 210 of FIG. 6, at a step 212, an event can be identified. At a step 214, the bids can be entered into the system. At a step 218, the bids can be compared to the highest previous winning bid, designated MINWIN. It should be recognized that the winning bid might be a single bid (in the case of an option to buy a ticket for a particular seat at a game) or the lowest previously winning bid from a set of bids (in the case of auctioning a set of seats to a particular event, e.g., team-round-game). If at the step 218 it is determined that the current bid is lower or equal to the previous minimum winning bid, then at a step 222 the bid is identified as unsuccessful, and a message is sent to the user at a step 224 informing the user of the same. If at the step 218 the bid is determined to exceed the previous minimum winning bid, then at a step 220 the MINWIN variable is increased to equal the new bid, and at a step 228 the user is informed that the bid is a valid bid. At the step 228 or the step 224, processing of the particular bid is complete.

It should be understood that an auction of options is only one possible format. For example, an acceptable option price could be predetermined, so that an option is purchased simply by paying the asking price. Alternatively, the option price could be determined based on a formula, such as one that includes as factors various components that determine the value of the certainty of having a ticket to the game or accommodations related thereto, such as the number of tickets already sold, the attractiveness of the teams involved, the likelihood (e.g., the odds) that a given team will make it to the particular game, etc. The systems and methods disclosed herein offer complete flexibility as to the pricing of options and the ranking or acceptance of bids to acquire options.

It should be understood that a variety of different purchasing systems can be used for the options and futures markets disclosed herein. For example, an initial sale of options could occur by auction, with a predetermined closing time. The auction could occur in a single day, an hour, or over a period of months. Alternatively, available options and futures could be sold in a series of auctions over time. In an embodiment, rather being sold in an auction, the options and futures are simply sold for predetermined prices. Once the options and futures are initially allocated, they could be bought or sold in an after-market supported by the systems and methods disclosed herein.

Figure 7:
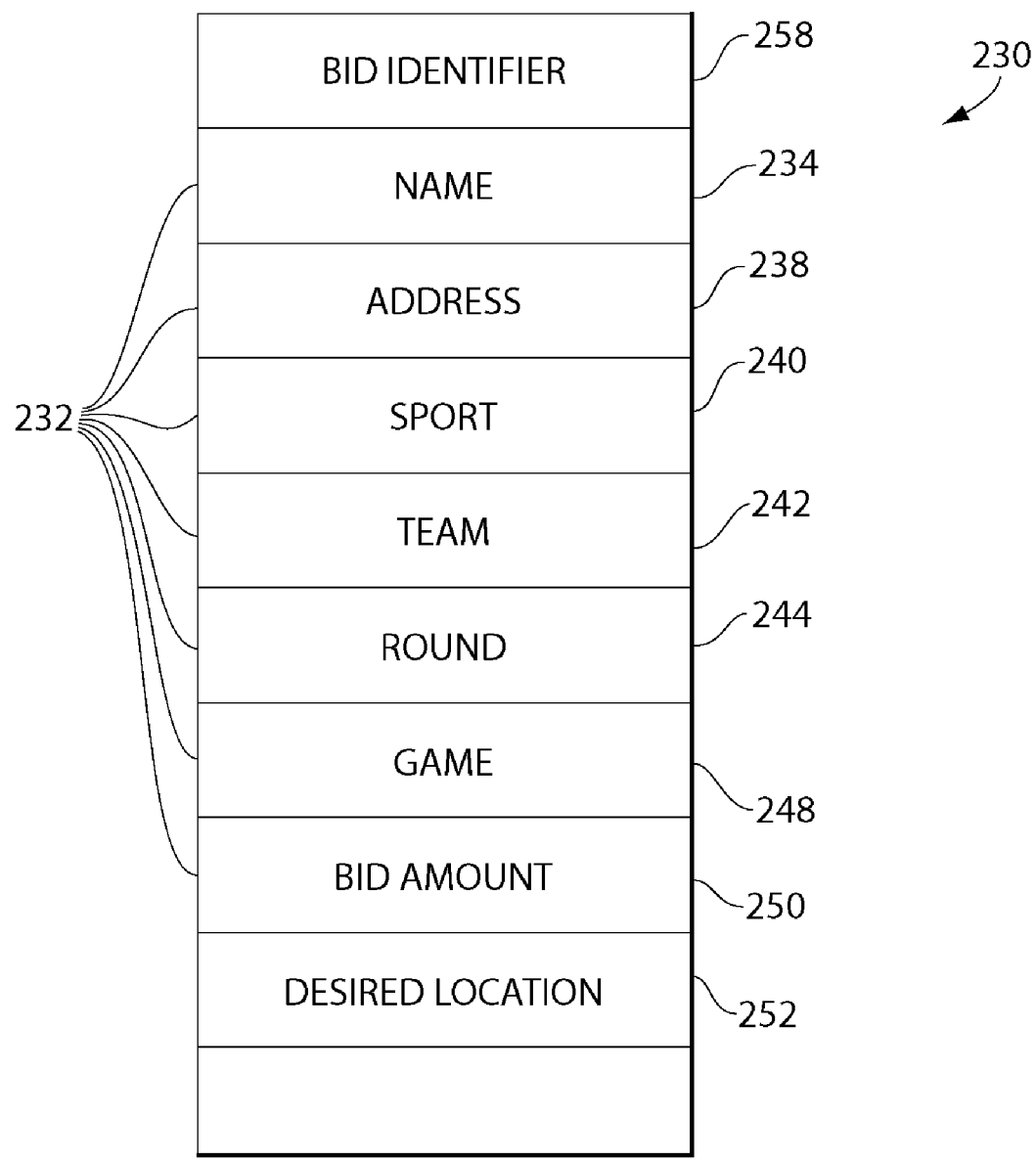
FIG. 7 is a schematic diagram illustrating a database structure for an embodiment of the present disclosure.

An exemplary data structure for the database 114 used to store option purchase information is depicted in FIG. 7. It should be understood that a wide variety of data structures and database tools could be used in accordance with the principles of this disclosure. In an embodiment, a database record 230 is depicted in schematic format. A record 230 may include a plurality of elements 232, which may correspond to information pertinent to a particular buyer 102 or to the buyer's bid to purchase an option. Thus, the record 232 may include a name element 234, an address element 238, a sport element 240, an team element 242, a round element 244, a game element 248, a bid element 250, a desired location element 252, a home game element 254. The record 230 may also include a unique bid identifier 258, which can be used to track the bid for processing purposes.

The elements 232 could be stored together and associated with a particular bid, or the elements 232 could be stored at diverse locations in memory and retrieved at runtime for processing. Depending on the nature of the options that are to be sold, different records may need to be retrieved. For example, if options for an NBA playoff game are to be sold, then an option would need to specify the buyer's team and the desired round of the playoffs, and, optionally, a restriction on distance to travel. In that case, processing would require access to the team field 242, the round field 244, and the game field 248. If only a home game is desired, then the home field 254 could be used.

Referring to FIG. 8, a register 260 is depicted in schematic format for tracking bids to options that are associated with a particular event. The register 260 should be understood as one of many conventional possible formats for storing information and could be implemented using a variety of conventional database programs and tools. In an embodiment of a register 260, if the triggering event for an option is the existence of a team-round-game (i.e., the presence of a particular team in a particular game of a particular round of playoffs, such as the NBA playoffs), then each possible team-round-game may be assigned a column 262 in the register 260. Each team-round-game may have a unique identifier 278, which may be stored at the head of the column 262 for that team-round-game. The register 260 may further include a plurality of rows 264. The rows may correspond to available options, e.g., tickets or accommodations, for that team round game. To continue the illustration, each ticket can be assigned a unique ticket identifier 280, corresponding to a ticket of the identified game in the identified round. The register 260 may be used to register and track bids. Thus, if a bid has been entered by a buyer 102, then the bid identifier, bid amount, and any other desired information about the bid can be stored in the register 260. For example, if a first bid is entered for an option to a team-round-game N, the bid can be stored in a register location 268 in the column for team-round-game N and the row for the first ticket. As additional bids are entered, additional rows in the column may be filled. Until the number of bids equals the number of available tickets, an entry 270 such as "NO BID" or the like can be included in the register. Once a bid exists for each of the available tickets, a variety of scenarios are possible. In cases where the options are sold at auction, the bids can be entered in descending order of the BID AMOUNT variable, so that the BID AMOUNT for the last bid in a column for a team-round-game is the minimum amount that must be exceeded for the next bid to be eligible to win the auction for the option, or MINWIN 274. The register can thus be used to track bids until the auction is closed, at which time all buyers with bids still appearing on the register will have purchased options for the particular team-round-game.

The register 260 can also be used in cases where options are sold at a fixed price. Rather than using a MINWIN variable, the bids can be stored in rows until all options are accounted for. In this case, the BID AMOUNT variable would not be necessary.

The register could also be used to establish a minimum price in the auction scenario, so that a bid is not registered unless it exceeds a previously established MINWIN amount. Different registers could be used to embody different allocation schemes, such as those involving home games at specific locations, games appearing within a particular span of dates, and the like.

The systems and methods disclosed herein may further provide buyers to trade or resell options that are purchased through the host. Thus, the host may serve as a secondary market for buying and selling the options by third parties.

It should be understood that local, state and other legal and regulatory requirements, to such as anti-scalping regulations, may restrict certain types of transactions in sporting event tickets. Accordingly, the systems and methods disclosed herein are intended to provide the host with flexibility as to the nature of the options provided, the rules for allocation of options, and rules regarding availability of resale. For example, the host could require the buyer 102 to agree not to resell the option, or the host could limit the price at which the buyer could resell the option, such as to the same price the buyer paid for the option.

Figure 9:
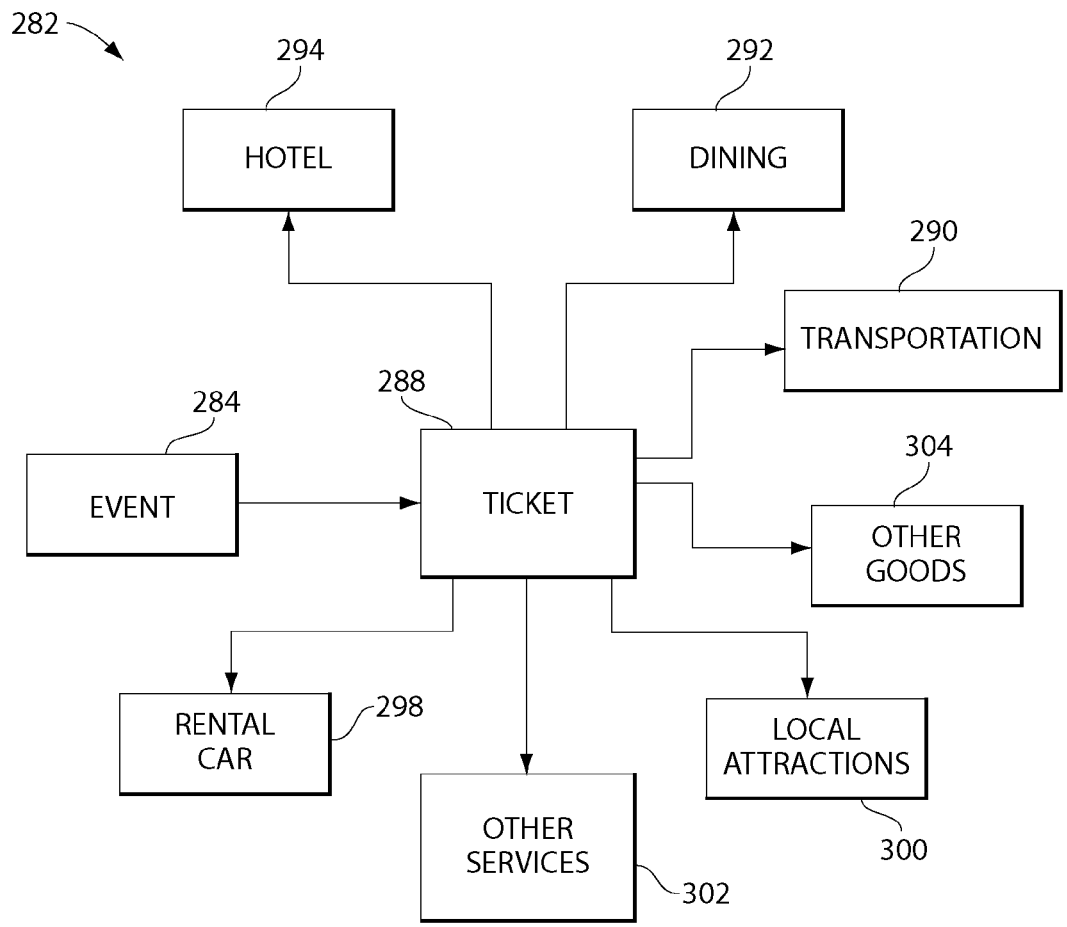
FIG. 9 is a schematic diagram illustrating providers of goods and services that are related to the existence of a sporting event involving a particular team.

Referring to FIG. 9, the benefits of the methods and systems disclosed herein to participants in markets associated with sporting events can be observed by reference to a schematic diagram 282. Upon the occurrence of an contingency event 284, such as presence of a team in a particular game of a particular round of the playoffs, or the like, a set of contingent needs are set in motion. First, a ticket 288 for the event is needed, as disclosed above. However, once the ticket has been secured (or simultaneously with securing the ticket) a need emerges for a wide range of other goods and services. Thus, a need may exist for transportation from a transportation provider 290, such as an airline, travel agent, charter air services, bus line, train line, or the like, all of which will be needed to get the buyer 102 to the event 284. A need may exist for dining services from a dining services provider 292, such as a restaurant or caterer. Thus, the provider 292 could provide reservations or catering services. A need emerges for accommodations from an accommodations provider, such as a hotel 294, motel, bed and breakfast, or other provider of accommodations. A need emerges for a rental car from a rental car agency 298 in the locale of the event. A need emerges for tickets to local attractions 300. A need emerges for certain particular goods 304, such as printed T-shirts memorializing the event and other souvenirs and mementos of the event. A range of other services can also be predicted to be needed, such as retail shopping and the like. Thus, upon occurrence of the contingency, each of the providers can identify a need.

By providing options or futures based on the triggering in advance, the methods and systems disclosed herein permit all of the participants, whether local businesses or national providers of goods and services, to plan well in advance of the event, rather than attempting to put in place plans in the short time between the emergence of the contingency and the actual event. Providers can also identify packages of goods and services that can be sold along with the tickets. Thus, not only options and futures to purchase tickets, but options and futures to purchase packages of other goods and services can be purchased, sold, traded and otherwise supported by the systems and methods disclosed herein. For example, a buyer 102 could purchase an option to attend the SUPER BOWL, stay in a Marriott Hotel in the city hosting the game, fly on a charter airline from the buyer's home city to the game city, and have dinner reservations at a leading restaurant in the city, all contingent on the buyer's team being present in the game. A variety of different combinations could be made available as packages, or the individual goods and services could be provided as separate options or futures contracts, so that the buyer 102 can choose which goods and services he wishes to commit to purchase, or wishes to have available to purchase, if his or her team appears in the designated event.

Once a market is established for options and futures to purchase goods and services the need for which is contingent upon the occurrence of a sporting event with a particular team (or other contingency), a variety of other benefits are available. Among other things, the host or the providers could then target advertising for related goods and services to the purchasers of the options. Thus, the market, once established, could support the delivery or a range of goods and services related to the entire locale of the sporting event, not just the event itself. Also, the purchasers would readily be identified as loyal fans of a particular team, which would permit additional targeting of advertisements for related goods and services.

If the host wishes to provide options at a predetermined price, rather than at auction, initial pricing of options and futures that are contingent on the existence of a particular sporting event having certain characteristics can be based in part on the odds that the sporting event (e.g., the identity of the participants) will occur. For many sports, the odds for or against a team appearing in a particular event can be calculated by various means known in the art. These odds can constitute a probabilistic factor that can be considered in determining an appropriate option price.

By way of example, and not limitation, a host can determine that a certain ticket for the SUPER BOWL is worth a given amount, say $5,000. Since a buyer could assure obtaining the ticket by purchasing options for tickets for all of the teams in one of the conferences, the sum total of the prices for all options for that conference cannot exceed $5,000. However, certain teams are much more likely to make it to the game. For example, if the odds against the NEW YORK JETS making the SUPER BOWL are 4-1, and the odds against the INDIANAPOLIS COLTS making the SUPER BOWL are 12-1, then an option to purchase a ticket if the Jets are in the SUPER BOWL should initially cost about three times as much, because the probability of a favorable outcome is three times higher. An appropriate initial pricing formula would satisfy the constraint that the sum of the price for all options be less than or equal to the certain price for the game:

$$P1+P2+\ldots, +Pn = \text{CERTAIN PRICE}$$

and the constraint that the ratio of an individual option price to the total price be inversely proportional to the odds against that team making it to the event:

P1 CERTAIN PRICE/ODDS AGAINST

Of course, actual option prices could be much higher, reflecting individual evaluations of the value of a ticket if a particular team is present.

While the foregoing embodiment depicts establishment of options and futures to purchase tickets and other goods and services related to sporting events, it should be understood that many other contingent events may be made the basis of options and futures.

In an embodiment, the contingent event may be defined by party seeking an option or futures contract. That is, the systems and methods disclosed herein may establish a marketplace in which a person seeking an options or futures contract may define and post a request, such as on a host Internet site, including a contingency event, a desired good or service the desire for which is dependent on the contingency and an offer or bid for an option or futures contract to acquire the goods or services if the contingency event occurs. Potential providers of the goods, services, or other items identified in the request could then respond by accepting the request or by offering a different price. Similarly, providers of goods and services could identify and post offers, such as on an Internet site, including a contingency event, a good, service, or other item the supply or demand for which is dependent on the contingency event, and the price at which the seller is willing to enter into a provide the good, service or other item at a predetermined price. Pricing of the option could be varied to provide a range of option prices to obtain a range of goods or services at a range of prices. Thus, a general marketplace can be established for permitting users, including buyers and sellers, to define and negotiate contingency event-based options and futures contracts.

Also, once systems and methods are established whereby an option or future may be defined, offered and sold, the same systems and methods can be used as a secondary marketplace for the options or futures, as well as for the underlying goods, services, information and other items to which the options and futures relate. An option or futures contract for a contingent event ticket would have a different value, depending on the probability of the contingent event's actually occurring. For example, if a particular team loses a game, then the probability of that team's making the playoffs is reduced, thus reducing the value of the option or futures contract for a ticket to that game involving that team. As the values diminish, optionholders may be willing to sell the options to recover some of the original purchase price. Similarly, others may be willing to buy at a lower price. Thus, a marketplace can be established where purchasers and sellers trade in options that are based on contingent events. Trading can be expected in any case where there are marketplace events that change the value of options; i.e., events that change the likelihood of a contingency emerging. Where contingencies emerge after a chain of many related marketplace events (such as the progression of a sports season), an active marketplace can be established for the trading of options and futures contracts based on the events.

Once a marketplace is established, it is possible to establish another level of options, futures or other derivative securities. Thus, for each type of options or futures contract described herein, there can exist still another class of options and futures contracts to acquire the options or futures. Thus, while there may only be a fixed number of available tickets, and only a fixed number of options can actually result in delivery of the ticket, a far larger number of individuals may purchase and sell options than can actually provide or take delivery on the tickets. Individuals who have a delivery obligation, but cannot ultimately deliver tickets, will be required to "cover," by paying the purchasers the value of the promised options (as measured, for example, by the trading price of an option or futures contract as of a fixed date). Thus, as in trading markets for commodities, many more options and futures are traded than underlying commodities are delivered. Additional levels of "options on options" could be envisioned and are encompassed by the present disclosure.

A wide variety of possible contingent event-based options and futures, related secondary markets, and options on options can be enabled by systems and methods disclosed herein. The following examples are intended to illustrate some examples of contingent events on which such options and markets can be based, but are by no means exhaustive. Other embodiments evident to those of ordinary skill in the art are intended to be encompassed by the present disclosure.

A contingency event may be any event that is expected to occur, but the outcome of which is unpredictable.

In one embodiment of the invention, the contingency event is related to weather. It can be predicted that weather will be relevant to a wide range of goods, services, and activities, but the weather itself cannot be predicted with a high range of long-term accuracy. Thus, a buyer 102 could purchase an option or futures contract for delivery of a weather-dependent good or service, with the purchase contingent upon the occurrence of a measurable weather event at a given time. Weather-dependent goods and services that could be made the subject of weather-contingent options and futures contracts include, but are not limited to air travel, skiing, weddings, parties, concerts, sports events, vacation packages, hotel reservations, all outdoor events and activities, hiking, camping, golf, surfing, swimming, amusement park attendance, and many others. Thus, for example, a purchaser could purchase an option to purchase a vacation package to a Caribbean island, contingent on the absence of any hurricanes in the Atlantic ocean one week before the date of departure. Similarly, a skier could purchase an option to have a hotel room and lift ticket at a given price, if there is a predetermined minimum amount of snow on the selected mountain a given number of days before the date of the ski trip. The options would allow buyers to purchase with diminished uncertainty, while sellers would have advance notice of potential demand. As with sports event options described above, the advance notice would permit planning, marketing of related goods and services, and, in some cases, the sale of multiple options for the same good or services. For example, many individuals are highly interested in bad weather. For example, a weather expert, newsperson, or weather buff might have a strong desire to have the opportunity to observe a hurricane close hand, while a vacationer might have no desire to vacation during the same storm. Thus, an option or futures contract for a travel package could be sold to each of them, with the former getting the package if a hurricane was identified as being within a given distance from the location at a given time, and the latter getting the package otherwise. Similarly, many non-ski attractions have arising around ski resorts, such as outlet shopping, family entertainment complexes and the like. However, during the peak season, price rise, and non-skiers typically avoid these locations. If there is no snow, there is substantial unused capacity at a given time. In order to help fill the unused capacity, options and futures contracts can be established to permit one person (presumably a skier) to have a hotel room, dinner reservation, or the like if there is a predetermined amount of snow and to permit another person (presumably a non-skier) to have the same item (presumably at a "non-peak" price) if there is less than the predetermined amount of snow. In other words, the systems and methods enable vendors to offer the same item to different individuals, depending on different tastes for weather-related goods and services. Weather related options and futures contracts would be particularly effective in booking off-peak times, such as early and late season skiing, golf, beach vacations, and the like. Thus, vendors could identify interested parties who would commit to purchase a package of items if the weather, as of a given date, is appropriate for the particular activity. For example, a skier could commit to a ski package in October or May, which would be contingent on the presence of snow. Knowing the skier might arrive, the vendor could target advertising for a host of related products and services, even if the skier doesn't end up purchasing the package.

In other embodiments, the contingent event may consist of a blending of one or more contingencies, including any of the contingencies identified herein. Thus, for example, a skier might purchase an option to acquire a hotel room and lift ticket on a particular mountain in May, if there is adequate snow, and if the price is lower than a predetermined amount.

In other embodiments, the contingency may be the unavailability or limited availability of a particular good or service. Thus, a user might purchase an option of futures contract to purchase a good, service, or other item if that item is sold out in the user's area, or if the price of the good in that area exceeds a predetermined price. Such a contract could identify a particular good or suite of goods of a given type. Examples might include popular toys, CDs, and other consumer items. For example, a buyer might purchase an option to acquire a particular item (or any of a group of items) offered by a major toy store, if the item or one of the items is sold out on December 20 of a given year. Similarly, a buyer could purchase an option to purchase tickets to a particular event, if the event is sold out. A buyer could purchase an option to acquire services, if the market rate for the services exceeds a certain rate, or if there are no individuals offering the services at a given time. The services could be a wide range of services, such as professional services, contracting services, legal services, accounting services, consulting services, plumbing services, development services, design services, engineering services and the like.

More generally, contingency events may include any events where different outcomes are possible, and where different purchasers are capable of benefiting from the different outcomes. Thus, any goods or services where buyer tastes vary depending on the outcome, such as weather, sporting events, performances, and the like.

In another embodiment, the contingency event may be the popularity of a particular item. For example, television programs are rated according to number of households and percentage of viewing households for each program. Those ratings reflect the popularity of a particular program. Whether a particular program has a particular popularity rating can be a contingency event upon which an option to purchase advertising time or space is based. Similar options and futures can be established for advertising in periodicals and books based on the circulation of the same. Similar options and futures can be established for Internet space. Since demographic information is often made available, options and futures can be established where the contingency event is the establishment of a particular rating in a particular demographic. Thus, for example, an advertiser could purchase air time at a given price and time if a particular television show has achieved an average of a twenty percent audience share among women aged twenty to thirty. As with other embodiments, a secondary market can be established, with market information arising each time ratings are announced, encouraging trading of options based on the ratings. Also, secondary services and goods can be targeted to particular advertisers, based on what they are seeking to advertise.

The methods and systems established herein can also be used to establish options and futures for non-traditional goods and services, where a future need is known and the buyer wishes to lock in the current price. Any goods or services can be covered, ranging from appliances, to home repairs, to fixtures, to automobiles, to concert tickets, to automobiles, to antiques, to collectibles, to used cars, to computers, to real estate, and many others.

In an embodiment, the contingent event may be defined by party seeking an option or futures contract. That is, the systems and methods disclosed herein may establish a marketplace in which a person seeking an options or futures contract may define and post a request, such as on a host Internet site, including a contingency event, a desired good or service the desire for which is dependent on the contingency and an offer or bid for an option or futures contract to acquire the goods or services if the contingency event occurs. Potential providers of the goods, services, or other items identified in the request could then respond by accepting the request or by offering a different price. Similarly, providers of goods and services could identify and post offers, such as on an Internet site, including a contingency event, a good, service, or other item the supply or demand for which is dependent on the contingency event, and the price at which the seller is willing to enter into a provide the good, service or other item at a predetermined price. Pricing of the option could be varied to provide a range of option prices to obtain a range of goods or services at a range of prices. Thus, a general marketplace can be established for permitting users, including buyers and sellers, to define and negotiate contingency event-based options and futures contracts.

Also, once systems and methods are established whereby an option or future may be defined, offered and sold, the same systems and methods can be used as a secondary marketplace for the options or futures, as well as for the underlying goods, services, information and other items to which the options and futures relate.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. A method of electronic commerce, comprising:
   identifying, from a database, a participant who could participate in a game;
   providing, in a register, a plurality of tickets for said game;
   establishing a network-based on-line system for sale of futures contracts to acquire said tickets for the game, wherein each futures contract is exercisable upon occurrence of a contingency, wherein the contingency relates to the position of said participant in the game in a standings at a time proximate to the occurrence of the game, wherein said participant could attain a position in the standings yet which position is unknown at the sale of said futures contract;
   offering, via a buyer device, said futures contracts for sale for each of said tickets for said participant that could, at the time of the offer for sale, attain a position in the standings; and
   triggering, in an order processing module of the network-based on-line system, the exercisability of said futures contracts associated with said participant when a position in the standings has been attained.

2. The method of claim 1, wherein the game is a participant-game.

3. The method of claim 2, wherein the participant-game is a team-round-game.

4. The method of claim 1, wherein at least one of said futures contracts is tradable, via the network-based on-line system, prior to said participant attaining a position in the standings.

5. The method of claim 1, wherein at least one of said futures contracts is tradable for another of said futures contracts.

6. The method of claim 1, wherein at least one of said futures contracts is tradable for a payment.

7. The method of claim 1, wherein at least one of said futures contracts further comprises an option for a travel accommodation associated with the game.

8. A computer program product embodied in a computer readable medium that, when executing on one or more computing devices, performs the steps of:
   identifying a participant who could participate in a game;
   providing a plurality of tickets for said game;

establishing a network-based on-line system for the sale of futures contracts to acquire said tickets for the game, wherein each futures contract is exercisable upon occurrence of a contingency, wherein the contingency relates to the position of said participant in the game in a standings at a time proximate to the occurrence of the game, wherein said participant could attain a position in the standings yet which position is unknown at the sale of said futures contract;

offering said futures contracts for sale for each of said tickets for said participant that could, at the time of the offer for sale, attain a position in the standings; and triggering the exercisability of said futures contracts associated with said participant when a position in the standings has been attained.

9. The computer program product of claim 8, wherein the game is a participant-game.

10. The computer program product of claim 9, wherein the participant-game is a team-round-game.

11. The computer program product of claim 8, wherein at least one of said futures contracts is tradable prior to said participant attaining a position in the standings.

12. The computer program product of claim 8, wherein at least one of said futures contracts is tradable for another of said futures contracts.

13. The computer program product of claim 8, wherein at least one of said futures contracts is tradable for a payment.

14. The computer program product of claim 8, wherein at least one of said futures contracts further comprises an option for a travel accommodation associated with the game.

15. A system for allowing a user to bid on an option to purchase a ticket to a game for which a plurality of participants could qualify to participate but have not qualified for said playoff game, comprising:

a database having stored therein an option record having a participant field representative of one of said plurality of participants being a candidate for participation in the game, an event field representative of the game, and a value field representative of a value of a minimum winning bid to purchase an option, the option being an option to purchase a ticket for the game on occurrence of a specified participant attaining a position in a standings at a time proximate to the occurrence of the game;

a server, in connection with said database, processing a bid representative of a request to purchase the option, and processing said bid and said option record to allocate an option contract to a winning bid; and an order processing module to exercise said option associated with a selected participant in response to said selected participant attaining a position in a standings.

16. The system of claim 15, wherein the game is a participant-game.

17. The system of claim 16, wherein the participant-game is a team-round-game.

18. The system of claim 15, wherein the option is tradable prior to said participant attaining a place in the standings.

19. The system of claim 15, wherein the option is tradable for a different option.

20. The system of claim 15, wherein the option further comprises an option to purchase a travel accommodation associated with the game.

* * * * *